(12) United States Patent
Grzybowski et al.

(10) Patent No.: US 7,480,432 B2
(45) Date of Patent: Jan. 20, 2009

(54) GLASS-BASED MICROPOSITIONING SYSTEMS AND METHODS

(75) Inventors: Richard R Grzybowski, Corning, NY (US); Brewster Roe Hemenway, Jr., Painted Post, NY (US); Lawrence Charles Hughes, Jr., Corning, NY (US); Stephan Lvovich Logunov, Corning, NY (US); Kamjula Pattabhirami Reddy, Corning, NY (US); Joseph Francis Schroeder, III, Corning, NY (US); James Scott Sutherland, Corning, NY (US); Alexander M. Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/365,391

(22) Filed: Feb. 28, 2006

(65) Prior Publication Data

US 2007/0201797 A1    Aug. 30, 2007

(51) Int. Cl.
*G02B 6/42* (2006.01)
(52) U.S. Cl. ........................................ 385/52
(58) Field of Classification Search ............... None
See application file for complete search history.

(56) References Cited

U.S. PATENT DOCUMENTS

| | | | | |
|---|---|---|---|---|
| 3,663,839 | A | 5/1972 | Low | 310/4 |
| 3,922,591 | A | 11/1975 | Olsen | 318/676 |
| 4,836,677 | A | 6/1989 | Doran | 356/350 |
| 5,069,419 | A | 12/1991 | Jerman | 251/11 |
| 5,136,200 | A | 8/1992 | Takizawa | 310/323 |
| 5,331,241 | A | 7/1994 | Itoh | 310/328 |
| 5,365,296 | A | 11/1994 | Murakami | 354/195.1 |
| 5,406,153 | A | 4/1995 | Flatau | 310/26 |
| 5,440,194 | A | 8/1995 | Beurrier | 310/328 |
| 5,452,878 | A | 9/1995 | Gravesen | 251/129 |

(Continued)

FOREIGN PATENT DOCUMENTS

EP    0219356    10/1986

(Continued)

OTHER PUBLICATIONS

"Thermal Expansion Type Microactuator with Paraffin as the Expansive Material* (Basic Performance of a Prototype Linear Actuator)", N. Kabei, M. Kosuda, H. Kagamibuchi, R. Tashiro, H. Mizuno, Y. Ueda and K. Tsuchiya, JSME International Journal Series C, vol. 40, No. 4, 1997, p. 736-742.

(Continued)

*Primary Examiner*—Tina M Wong
(74) *Attorney, Agent, or Firm*—Gregory V. Bean; Michael W. Russell

(57) ABSTRACT

Glass-based micropositioning systems and methods are disclosed. The micropositioning systems and methods utilize microbumps (40) formed in a glass substrate (12 or 100). The microbumps are formed by subjecting a portion of the glass substrate to localized heating, which results in local rapid expansion of glass where the heat was applied. The height and shape of the microbumps depend on the type of glass substrate and the amount and form of heat delivered to the substrate. The microbumps allow for active or passive micropositioning of optical elements, including planar waveguides and optical fibers. Optical assemblies formed using microbump micropositioners are also disclosed.

34 Claims, 19 Drawing Sheets

U.S. PATENT DOCUMENTS

| | | | | |
|---|---|---|---|---|
| 5,529,279 | A | 6/1996 | Beatty | 251/11 |
| 5,714,832 | A | 2/1998 | Shirrod | 310/328 |
| 5,720,169 | A | 2/1998 | Schneider | 60/530 |
| 5,881,198 | A | 3/1999 | Haake | 385/136 |
| 5,909,078 | A | 6/1999 | Wood | 310/307 |
| 5,977,685 | A | 11/1999 | Kurita | 310/311 |
| 6,002,180 | A * | 12/1999 | Akram et al. | 257/783 |
| 6,072,251 | A | 6/2000 | Markle | 310/12 |
| 6,275,320 | B1 | 8/2001 | Dhuler | 359/237 |
| 6,310,419 | B1 | 10/2001 | Wood | 310/306 |
| 6,313,562 | B1 | 11/2001 | Barnes | 310/306 |
| 6,333,522 | B1 * | 12/2001 | Inoue et al. | 257/99 |
| 6,494,433 | B2 | 12/2002 | Mastrangelo | 251/11 |
| 6,512,642 | B1 | 1/2003 | Bourcier | 359/813 |
| 6,698,201 | B1 | 3/2004 | Sarkar | 60/527 |
| 6,739,132 | B2 | 5/2004 | Bromley | 60/527 |
| 6,978,068 | B2 * | 12/2005 | Wilson et al. | 385/52 |
| 2001/0040150 | A1 * | 11/2001 | Suzuki | 219/121.69 |
| 2002/0008445 | A1 | 1/2002 | Pelrine | 310/330 |
| 2002/0011758 | A1 | 1/2002 | Agrawal | 310/307 |
| 2002/0013555 | A1 | 1/2002 | Seward | 604/247 |
| 2002/0037221 | A1 | 3/2002 | Mastrangelo | 417/10 |
| 2003/0184189 | A1 | 10/2003 | Sinclair | 310/309 |
| 2004/0012298 | A1 | 1/2004 | Cunningham | 310/306 |
| 2005/0269303 | A1 * | 12/2005 | Lutz | 219/121.85 |

FOREIGN PATENT DOCUMENTS

| | | |
|---|---|---|
| EP | 0365011 | 10/1989 |
| EP | 0404005 | 6/1990 |
| EP | 0478716 | 6/1990 |
| EP | 1031735 | 2/2000 |
| WO | WO0170428 | 3/2001 |
| WO | WO0173805 | 10/2001 |

OTHER PUBLICATIONS

"Thermally-and Phase Transformation-Induced Volume Change of Polymers for Actuator Applications", B.Z. Jang and Z.J. Zhang, Journal of Intelligent Material Systems and Structures, vol. 5, Nov. 1994, p. 758-763.

"Design and Implementation of a Paraffin Based Micropositioning Actuator", David E. Dowen-Starsys Research Corporation, SPIE, vol. 3132, 1997, p. 127-134.

"Simple, High Actuation Power, Thermally Activated Paraffin Microactuator", E. T. Carlen and C.H. Mastrangelo, The University of Michigan, Ann Arbor, MI., Presented at the Transducers 99 Conference, Sendai, Japan, Jun. 7-10, 1999, p. 1-4.

* cited by examiner

GLASS-BASED MICROPOSITIONING SYSTEMS AND METHODS

BACKGROUND OF THE INVENTION

1. Field of the Invention

The present invention relates generally to micropositioning, and particularly to glass-based micropositioning systems and methods.

2. Technical Background

A micropositioner is a device capable of placing a small object in a desired location and holding it there with a relatively high degree of accuracy and precision. Such positioning is sometimes referred to as either "micropositioning" or "microalignment." Micropositioners (also referred to as "microactuators") come in many different forms, such as electromagnetic, mechanical, piezo-electric, micro-electromechanical (MEMS), etc., and are used for a wide variety of applications.

Micropositioners are becoming increasingly important in the field of optics, particularly with respect to guided-wave and integrated optics. Planar waveguide technology, for example, enables high-density integration of optical functions, and allows for low-cost fabrication of integrated optical devices using standard semiconductor processing techniques. Hundreds of complex passive or active devices (e.g., arrayed waveguide gratings (AWGs) multiplexer/demultiplexers or semiconductor optical amplifiers (SOAs)) can be fabricated on a single planar substrate using high-index waveguide technologies.

Planar integrated optical devices generally require multiple waveguide interconnections to external optical components, which are typically provided via optical fiber pigtail interconnections. In cases where the planar waveguide mode field diameter is closely matched to that of a single-mode optical fiber (e.g., ~9 µm), multiple external interconnections can be provided using optical fiber arrays mounted in precision fiber array pigtail blocks. These blocks, which are fabricated using silicon V-groove arrays or machined glass or ceramic blocks, typically align (low-eccentricity) fiber cores with lateral misalignments of <0.5 µm offset from ideal on-pitch positions across the fiber array.

Low-loss coupling to high-index planar waveguide arrays can be more difficult using fiber array pigtail blocks, since the smaller mode field diameters (typically 3.5-4.0 µm) are more sensitive to lateral misalignments. For example, a 0.5 µm core misalignment contributes 0.3-0.4 dB to the interconnection insertion loss. Use of fiber array pigtail blocks also requires that planar waveguides be positioned on a pitch equal to or greater than the optical fiber diameter (typically 127 µm for 125 µm diameter fiber). In some cases (e.g., SOA arrays), this pitch requirement can lead to oversized planar device chips and wasted real estate, increasing device cost. Narrow pitch SOA array waveguides are also desirable for minimizing vertical misalignments of waveguide centers due to SOA array chip warpage induced before or after chip mounting (e.g., waveguide "smile"). Use of pigtail blocks typically involves direct mechanical attachment of the fiber array block to the planar waveguide substrate using organic adhesives.

Some planar device substrates (e.g., SOA arrays) are too thin and/or small to make this attachment approach practical. Control of adhesive flow before thermal or UV curing is also an issue when making attachments to air-clad waveguides and active devices, since sudden cladding index changes can lead to unwanted back reflections and/or scattering.

In light of the difficulties mentioned above for fiber pigtail blocks, low-loss connections to small mode field diameter waveguides are often made by active micropositioning of individual optical fibers to planar waveguides. Optical fibers can be fabricated with lensed or wedged tips that provide a low-loss mode field transformation between the small planar waveguide mode and a larger single-mode fiber (SMF) waveguide mode. These optical fibers are generally actively aligned and then fixed in place using solder, laser welding or organic adhesives. In general, post-attachment lateral shifts induced by the adhesive material necessitate additional bending, nudging or (in the case of laser welding) laser hammering to bring the fiber back into alignment with the planar waveguide.

Since each planar waveguide interconnection requires a separate optical fiber alignment step, the alignment process grows increasingly complex as the number of waveguide interconnections increases. This has a direct impact on the yield of the assembly and hence, the cost. Additionally, the fixturing hardware required to hold the fiber in place during attachment (e.g., laser weld clips) generally increases the planar waveguide pitch, further increasing planar device size and cost. Laser weld attachment methods that require rebending are generally undesirable in planar array interconnection applications, since rebending the optical array interface in the plane of the planar substrate introduces unwanted axial separations between waveguides at one end of the array or the other.

Planar waveguide device micropositioning is typically provided by an external precision micropositioning system (e.g., multi-axis translation/rotation stages driven by piezo-electric micropositioners). While such systems can generally align waveguide arrays on two planar waveguide devices to within less than 0.2 µm of lateral misalignment, a critical issue is maintaining waveguide alignment during adhesive curing without post-attachment rework. Crystal block attachment is one solution for zero-shift attachment of devices to substrates, but the cantilever nature of the planar device attachment to the common alignment substrate via an intermediate block makes the approach less suitable for planar devices requiring wirebonded electrical interconnections. Additionally, a six-axis positioning system is required to align the two substrates.

An alternative planar device micropositioning and attachment approach involves integrating or mounting the micropositioners on a common alignment substrate. Such micropositioners have been based on a number of different technologies, such as expansion and/or contraction of piezo-electric materials, electro-strictive materials, magneto-strictive and magnetic materials. Such micropositioners have also been fabricated based on electrostatic forces between plates and substrates, electrically-induced shape changes in polymers, and ultrasonic excitation of flexure elements. Another common integrated micropositioner approach takes advantage of material expansion and/or contraction via thermomechanical effects.

All of the micropositioning techniques mentioned above generally require continuous control input (e.g., an electrical signal) in order to maintain their position. This is a significant disadvantage in micropositioning hybrid optical components because control input must be maintained over the life of the product. Further, many of the micropositioning technologies described above require complex and expensive precision microstructures (e.g., MEMS) that increase product cost.

SUMMARY OF THE INVENTION

A first aspect of the present invention is a method of forming a microbump for micropositioning an optical element.

The method includes providing a glass substrate having an upper surface, wherein the substrate is capable of locally expanding when locally heated, and then locally heating the substrate to cause local expansion of the substrate to create a microbump in the substrate surface. The method also includes terminating heating of the substrate so as to fix the microbump.

A second aspect of the invention is the above-described method, wherein the glass substrate is a light-absorbing substrate, and wherein locally heating the substrate includes locally irradiating the substrate with a light beam.

A third aspect of the invention is a method of micropositioning first and second optical elements relative to each other. The method includes arranging the first and second optical elements so that they are roughly aligned to one another, wherein at least one of the first and second optical elements is supported by a glass substrate capable of locally expanding when locally heated. The method also includes micropositioning at least one of the first and second optical elements by forming one or more microbumps in the glass substrate by locally heating the glass substrate to move at least one of the first and second optical elements to more closely align the first and second optical elements.

A fourth aspect of the invention is an optical assembly that includes a glass substrate with a surface having one or more microbumps formed thereon by local glass expansion of the substrate due to locally heating the substrate in corresponding one or more locations. The assembly also includes a first optical element supported by the one or more microbumps so as to be micropositioned relative to the substrate surface or to another optical element.

Additional aspects, features and advantages of the invention are set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Reference is now be made in detail to the present preferred embodiments of the invention, examples of which are illustrated in the accompanying drawings. Whenever possible, the same reference numbers and symbols are used throughout the drawings to refer to the same or like parts.

The present invention includes micropositioning systems and methods that rely on the formation of one or more microbumps in light-absorbing glass substrates. In the description below, various methods of forming microbumps in the light-absorbing substrates are first described. This is followed by a description of example embodiments of methods for micropositioning an optical element via the formation of one or more microbumps in the light-absorbing substrate. An example embodiment of an optical assembly formed using the microbump micropositioning methods of the present invention is then described.

In the description below, reference is made to PYREX glass, and PYREX is a registered trademark of Corning, Inc., Corning, N.Y. Also, the term "microbump" is broadly understood to include various shapes such as circular islands, elongate ridges, etc., as formed in an IR-absorbing glass substrate using the methods described below.

Further, the term "optical element" is understood to mean any type of optical component, such as an optical fiber, a planar waveguide substrate, a lens, a microlens, a grating, a beamsplitter, etc., that is capable of being micropositioned. Likewise, the term "optical assembly" as used herein includes a system or structure that includes optical elements, whether alone or in combination with other types of elements, such as electrical, electro-optical, electro-mechanical or mechanical elements.

Also, the phrase "light-absorbing substrate" is understood to mean a substrate that absorbs light at an absorption wavelength such as at a visible, near-infrared and/or infrared wavelength, wherein local absorption of the light by the substrate at one or more of the absorption wavelengths locally heats the substrate.

Microbump Formation in a Monolithic IR-absorbing Glass Substrate

Figure 1:
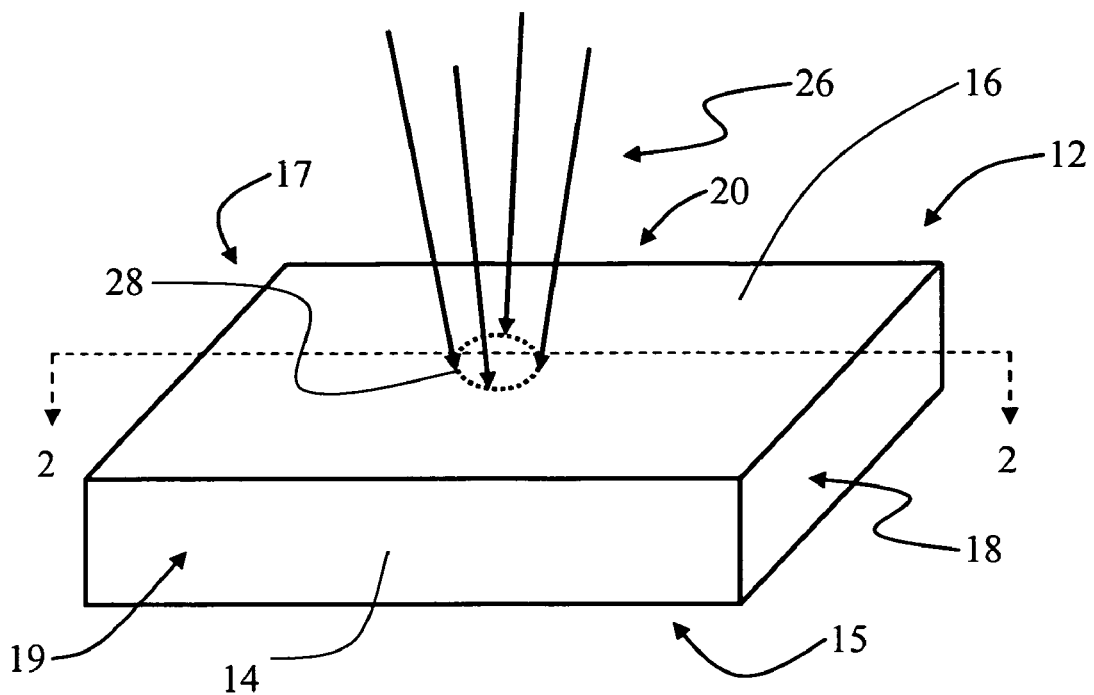
FIG. 1 is an elevated view of an light-absorbing glass substrate being irradiated with a radiation beam in an example embodiment of a method of forming microbumps used for micropositioning.
Figure 2:
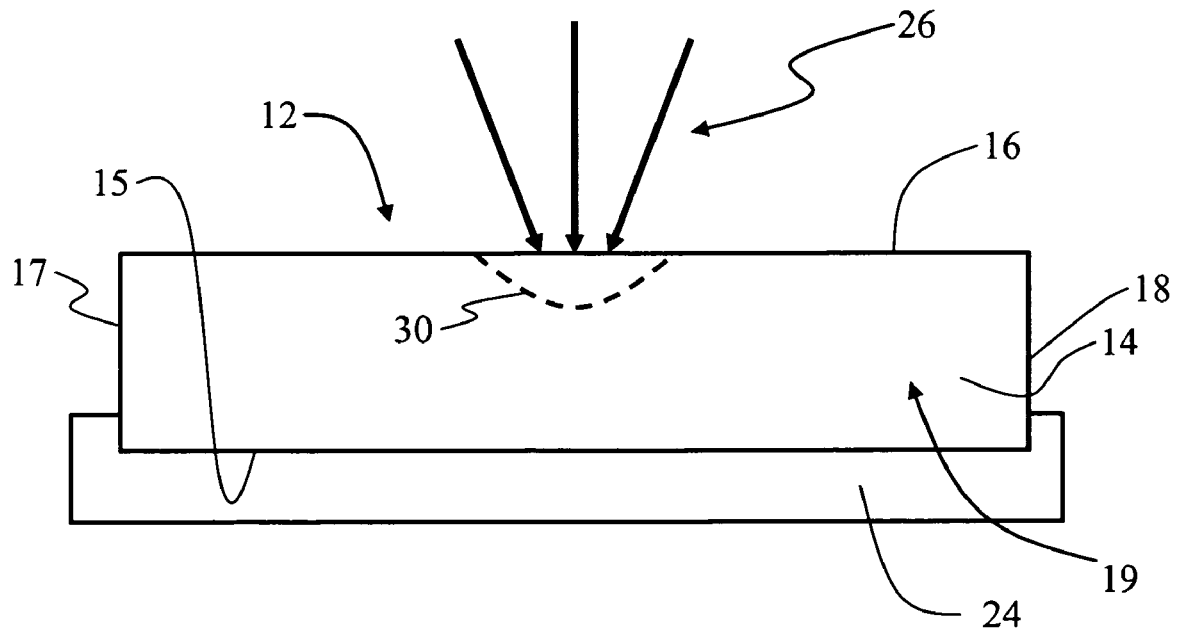
FIG. 2 is a cross-sectional view of the substrate of FIG. 1 as taken along the line 2-2 of FIG. 1, showing the formation of a glass expansion zone associated with the locally heated portion of the glass substrate, and also showing the substrate being held by a moveable support stage adapted to move the substrate relative to the radiation beam.

FIG. 1 is an elevated view of a monolithic light-absorbing glass substrate 12 having a body portion 14, a lower surface 15 and an upper surface 16. FIG. 2 is a cross-sectional view of substrate 12 as taken along the line 2-2 in FIG. 1. Substrate 12 also includes opposite sides 17 and 18, and opposite sides 19 and 20. FIG. 2 additionally shows a movable support stage 24 that supports substrate 12 and in an example embodiment is translatable in the substrate plane. In a preferred embodiment, substrate 12 is a glass substrate capable of absorbing light or heat energy in a localized region and in response thereto, rapidly expanding or swelling in the localized heated region. Suitable examples of substrate 12 include IR-absorbing glass such as the family of IR-absorbing PYREX glasses available from Corning, Inc. In an example embodiment, substrate 12 includes certain IR-absorbing species such as metal dopants (e.g., Cu, Fe, Co or V) that cause the glass to experience a dramatic and local reduction in density when heated rapidly at a given location, resulting in glass expansion. In an example embodiment, substrate 12 has a thickness on the order of approximately 1 mm.

The method of forming microbumps in substrate 12 includes locally heating the substrate. In an example embodiment, this involves directing a light beam 26 to a localized region of substrate 12 as defined by a beam spot 28 (FIG. 1) formed by the light beam on substrate upper surface 16. Substrate 12 is irradiated so as to locally heat the substrate. In an example embodiment, light beam 26 is convergent.

The position of beam spot 28 on upper surface 16 is selectable by moving support stage 24 or by simply adjusting the position of light beam 26. In an example embodiment, a laser, such as a $CO_2$ laser that emits radiation (e.g., at 10.6 µm), thereby generating a light beam 26 having an IR wavelength. In another example embodiment, light beam 26 has a near-infrared (NIR) wavelength of 810 nm. The relatively long Rayleigh range of a laser-generated light beam 26 ensures that even minor variations in beam focus (including, for example, focus error caused by a slight polished wedge in substrate 12) do not strongly influence the size of beam spot 28 during stage translation. In another example embodiment, light beam 26 includes at least one of a visible wavelength, an NIR wavelength and an IR wavelength. In an example embodiment, visible wavelengths range from ~400 nm to ~750 nm, NIR wavelengths range from ~750 nm to ~1100 nm, and IR wavelengths include wavelengths in the range from ~1100 nm to ~1680 nm.

The absorption of light by substrate body 14 from light beam 26 locally heats the substrate and initially raises the temperature of the portion of the substrate body in proportion to intensity of the light beam. If light beam 26 has a circularly symmetric cross-sectional intensity distribution, such as a Gaussian distribution, then beam spot 28 is circular and the substrate expansion occurs over a circular region as well.

In an example embodiment of the invention, the amount of heat introduced into substrate body 14 by light beam 26 decays with distance from upper surface 16. In an example embodiment, substrate body 14 has substantially uniform absorption so that light beam 26 decays exponentially with distance from upper surface 16, resulting in an exponential reduction in heating with depth.

In another example embodiment, the variation of glass absorption with depth is non-exponential, e.g., via stacking glasses with different absorptions or locally altering the composition of substrate body 14. For example, the substrate heating is relatively uniform through the thickness of substrate body 14. To achieve this effect, in an example embodiment the absorption of the glass is made to vary according to the reciprocal of the distance from the non-illuminated side. In another example, the depth at which peak optical absorption occurs is modified by employing an exponentially decaying glass absorption where the decay occurs moving away from the non-illuminated side and adjusting the rate of exponential decay of the glass absorption. In general, relatively arbitrary heating profiles can be produced by providing the appropriate glass absorption profile. In an example embodiment of the present invention, this principle is used to enable upper surface glass bump formation via illumination from the lower surface.

When light beam 26 is locally absorbed by substrate body 14, a limited expansion zone 30 is created within the substrate body. Within expansion zone 30, the rapid temperature change induces a dramatic decrease in substrate density. Thus, an example embodiment of the method includes modifying the depth of expansion zone 30 by adjusting the intensity of light beam 26, the size of beam spot 28 and/or the irradiation duration. In an example embodiment, the depth of expansion zone 30 is changed or made selectable by adjusting the concentration of IR-absorbing materials in the substrate, as described above.

Figure 3:
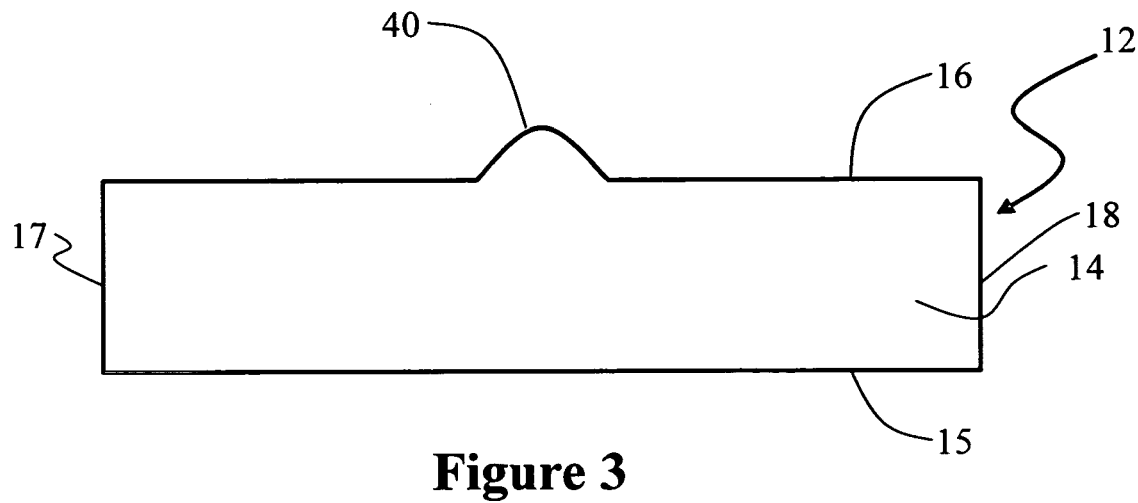
FIG. 3 is a cross-sectional view of the substrate of FIG. 1 after being irradiated as illustrated in FIG. 2, showing the formation of a microbump due to the expansion of glass in the expansion zone as illustrated in FIG. 2.

Since expansion zone 30 is constrained by unheated (and therefore unexpanded) regions of substrate body 14 surrounding the expansion zone, the substrate material within the expansion zone is compelled to relieve internal stresses by deforming upward, thereby forming a microbump 40, as illustrated in FIG. 3. In an example embodiment, the surface profile of microbump 40 corresponds to the light beam intensity distribution, with the microbump peak corresponding to the location of the highest beam intensity. In an example embodiment, light beam 26 is scanned over substrate surface 16 (e.g., by moving support stage 24) and stopping at specific locations so as to form microbumps 40 of various shapes and sizes. Bump profiles of various sizes and shapes can also be formed by adjusting the light beam power, sweep velocity and path during the course of the bump forming process for a single pump.

The method of forming microbump 40 further includes fixing the microbump by rapidly cooling the heated region of the substrate. In an example embodiment, this is accomplished by simply terminating the irradiation of substrate surface 16 by IR radiation beam 26.

Figure 4A:
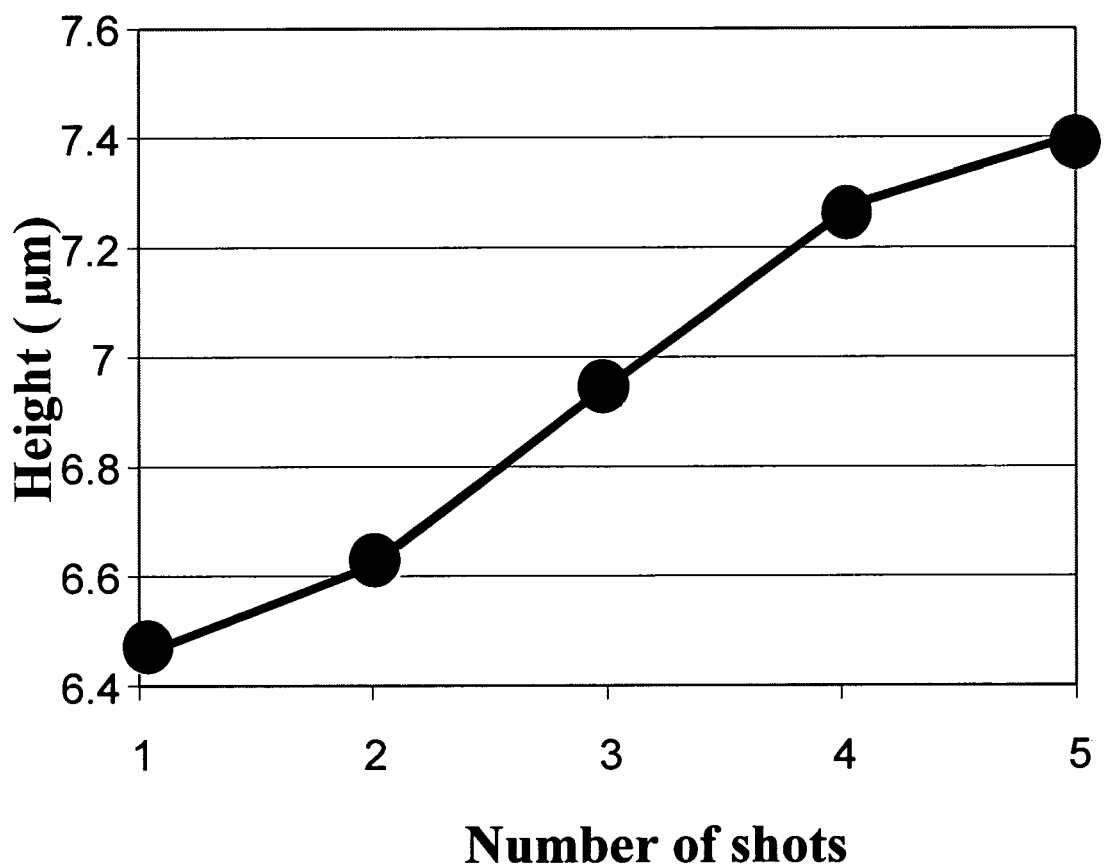
FIG. 4A is a plot of microbump height ($\mu m$) versus the number of shots from a light beam for microbumps formed in a Cu-doped IR-absorbing PYREX glass, where the light beam was formed using a laser emitting radiation at 810 nm.

FIG. 4A is a plot of microbump height (µm) versus the number of laser shots for microbumps 40 formed in a Cu-doped IR-absorbing PYREX glass sample using a laser emitting a light beam 26 having a NIR wavelength of 810 nm. The shots (pulses) had a duration of 100 ms and an energy of 0.2 J per shot. A time interval of 1 s was introduced between shots when multiple shots were made in order to allow laser-induced heating to dissipate in the substrate. The laser was focused down to a ~400 µm mode field diameter (MDF) spot 28 on substrate surface 16.

The microbump heights were measured using an interferometer. The microbump height measurements confirmed that the microbump height can be increased by increasing the amount of energy that light beam 26 delivers to substrate 12. The results show that as more energy is delivered to the substrate, the size of the resulting microbump increases to a given height, and then saturates. The measurements presented in the plot of FIG. 4A indicate that microbumps 40 with heights of ~7 µm can be created in aforementioned substrate 12. Above, it was mentioned that, in general, microbump heights of 30-100 µm are typically preferred for vertical lateral alignment of hybrid optical components.

Figure 4B:
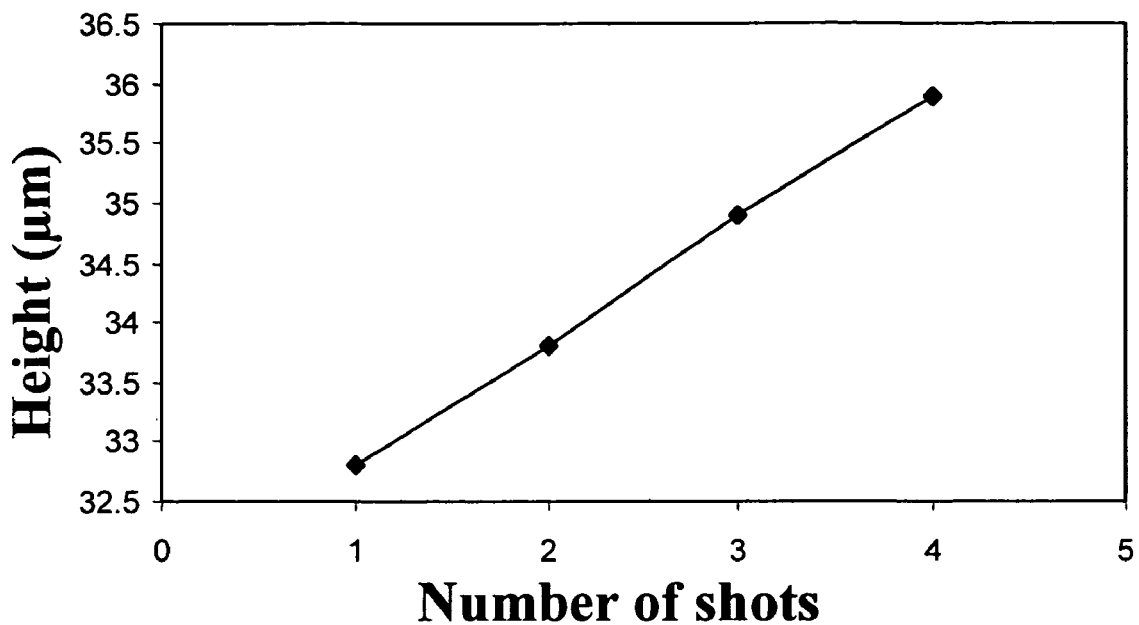
FIG. 4B is a plot of microbump height ($\mu m$) versus the number of shots from a light beam used to heat an existing microbump, illustrating how the microbump height can be increased by adding heat to the microbump in the form of equal-intensity light pulses.

FIG. 4B is a plot similar to FIG. 4A, but wherein additional heat in the form of IR-radiation from a light beam 26 was provided to an existing microbump 40 on a Fe-doped Pyrex-type glass substrate. The measurement results associated with the plot of FIG. 4B show that the height of an existing microbump 40 can be increased by delivering additional heat energy to the microbump. Microbump height increases were observed when the sequential applications of heat had the same amount of heat energy (e.g., sequential light pulses having the same intensity).

Figure 4C:
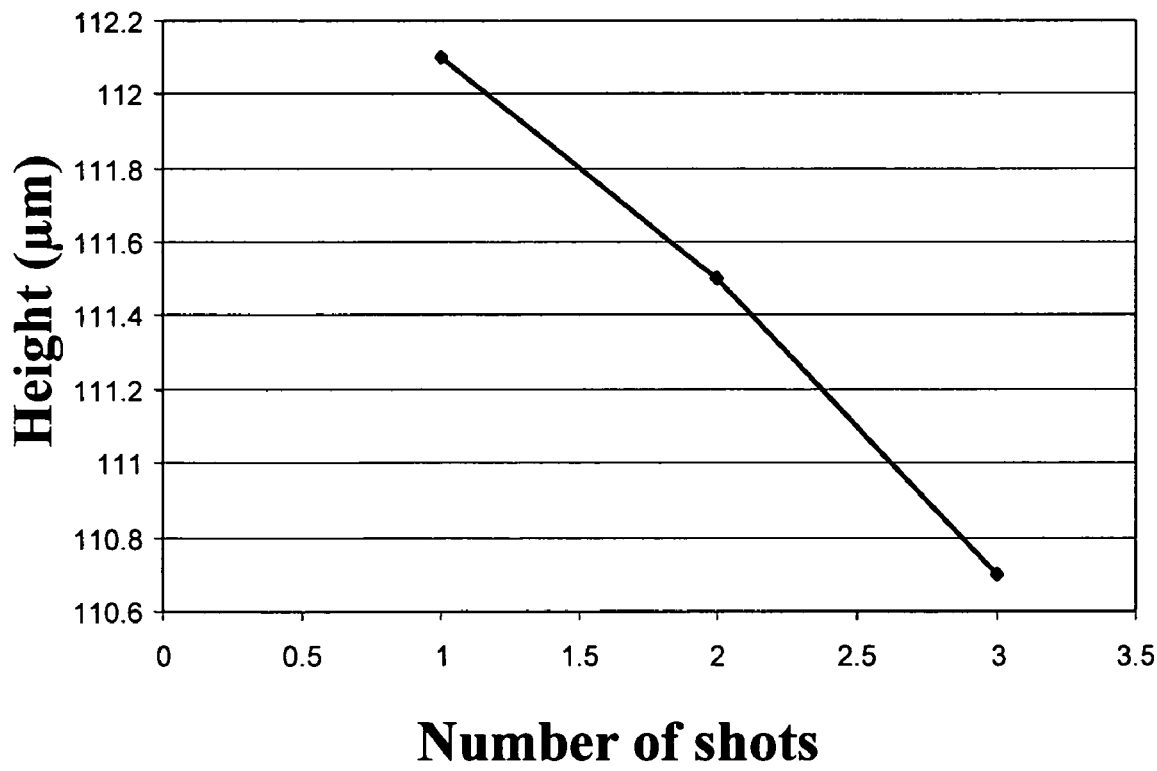
FIG. 4C is a plot of microbump height ($\mu m$) versus the number of shots from a light beam, illustrating how the microbump height can be decreased by adding heat to the microbump in the form of decreasing-intensity light pulses.

The inventors have also discovered that at the addition of heat to a microbump can cause a decrease in microbump height. In particular, if the heat energy of subsequent light pulses (shots) is lower than that of the first pulse, the height of microbump 40 decreases, as illustrated in the plot of FIG. 4C.

Thus, in an example embodiment of the present invention, the height of microbump 40 is changed to a select target height by the selective addition of heat to the microbump. The ability to change the microbump height by additional heating allows for precise micropositioning of optical elements, as described below.

In an example embodiment, a change in microbump height is accomplished using closed-loop monitoring of the microbump height between applications of select amounts of heat—e.g., between light pulses that are absorbed by light-absorbing substrate 12. In one example embodiment, microbump height monitoring is direct (e.g., physical measurement of microbump height), while in another example embodiment it is indirect via active alignment, e.g., determining the microbump height by measuring optical power coupled through an optical component resting on top of the microbump. This latter example embodiment is discussed in greater detail below.

In another example embodiment, microbump height is reduced by annealing the microbump to a high temperature, e.g., between 500° C. and 650° C. To increase the size of microbumps 40, experiments were performed on a similar IR-absorbing PYREX glass where the size of spot 28 was increased via beam defocusing. Microbumps of up to ~77 μm were formed using a larger diameter IR laser beam. The increased microbump height is associated with the formation of a larger expansion zone 30 due to the increased size of spot 28. Since the larger diameter beam distributes laser energy over an increased area, larger energy doses are required to rapidly locally heat the substrate to the point where dramatic density reduction occurs. The benefit of this approach is that the maximum microbump height is less likely to saturate at a small height.

Experiments show that microbump height is strongly dependent on the rate at which heat energy is delivered to the light-absorbing glass substrate. In one experiment, four microbumps were produced at a laser energy dose of 2.4 J. Two microbumps of heights of about 50 μm and 45 μm were produced by one 300 ms laser pulse at a power level of 8 W, while two microbumps of heights of about 10 μm were produced by one 600 ms laser pulse at a power level of 4 W. Even though the total energy dose was the same for the two cases, the glass density reduction (and therefore the glass expansion) was shown to depend on the rate of heating and cooling, which is greater for the shorter, higher-power radiation pulse. This provides guidance on process optimization when large microbumps are required, since the light beam power level must be great enough to induce large glass density changes, but small enough to avoid premature microbump height saturation and large height variations due to excessive local glass melting and flow. The experimental results also showed that the same glass substrate supports both small microbumps (0-5 μm in height) as well as large microbumps (>50 μm in height).

Figure 5:
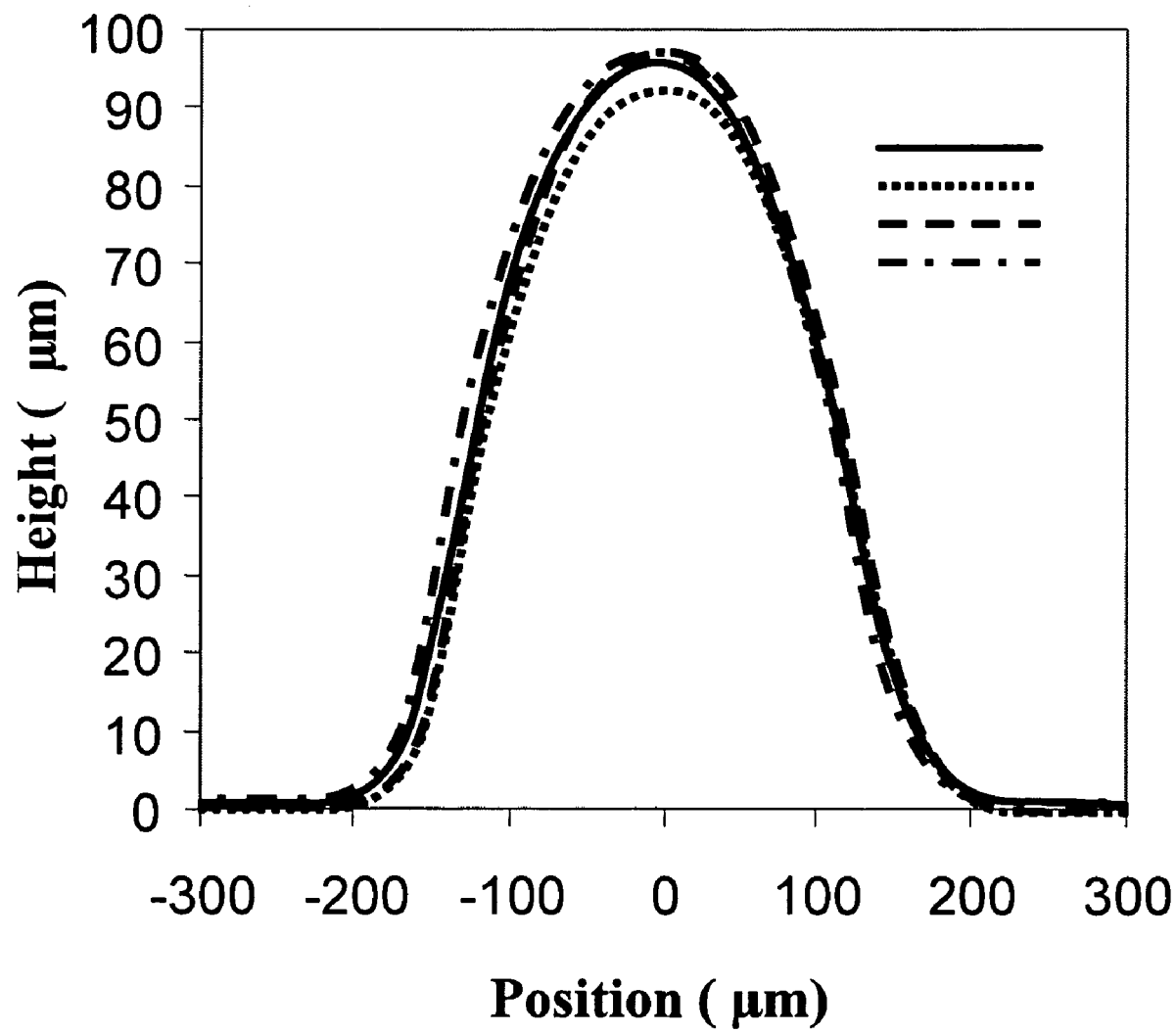
FIG. 5 is a plot of microbump height ($\mu m$) versus position ($\mu m$) for, four different microbumps formed using a focused IR-wavelength light beam generated by a laser that emitted single pulses of radiation of 3.6 W.

Microbump height uniformity measurements were also carried out on another IR-absorbing PYREX glass type doped with Fe instead of Cu. FIG. 5 is a plot of microbump height (μm) versus position (μm) for four different microbumps 40 formed using a focused IR radiation light beam 26 generated by a laser. Single laser pulses at 3.6 W were used. The plot in FIG. 5 shows microbump heights of almost 100 μm. The large microbump heights are thought to be due in part to local changes in the IR absorption of the glass during substrate heating. In particular, the inventors believe that the radiation-induced heating induces a change in the Fe oxidation state in the glass, where the new oxidation state has an IR absorption lower than the original oxidation state. This change in IR absorption allows more radiation to penetrate deeper into the substrate. This deeper-penetrating laser radiation in turn induces local heating, glass expansion and the Fe oxidation state change, which allows the IR-radiation to penetrate even deeper. In a borosilicate glass doped with Ti and Ce lower absorption helped to form ~195-μm high bumps using 27-J, 1-s long laser pulses.

In an example embodiment, a power-stabilized light beam 26 is employed to ensure that size of spot 28 is uniform and repeatable, which leads to the formation of microbumps 40 having uniform height. Also in an example embodiment, substrates 12 having high degree of compositional uniformity both within each sample and from sample to sample are used to further ensure uniform microbump height.

Microbump Formation in a Layered Glass Substrate

In some applications, it is desirable to perform micropositioning in a relatively thin gap (e.g., 100-200 μm). Microbumps formed on a monolithic light-absorbing glass substrate as described above would not be expected to swell dramatically in narrow gap configurations, limiting the range of micropositioning via microbump formation in this situation to relatively small values (e.g., 5-10 μm).

In thin-gap micropositioning applications where relatively large microbumps (e.g., 20-40 mm) are required, an alternative embodiment of microbump is used. The method is similar to that described above, but employs a layered rather than a monolithic substrate.

Figure 6:
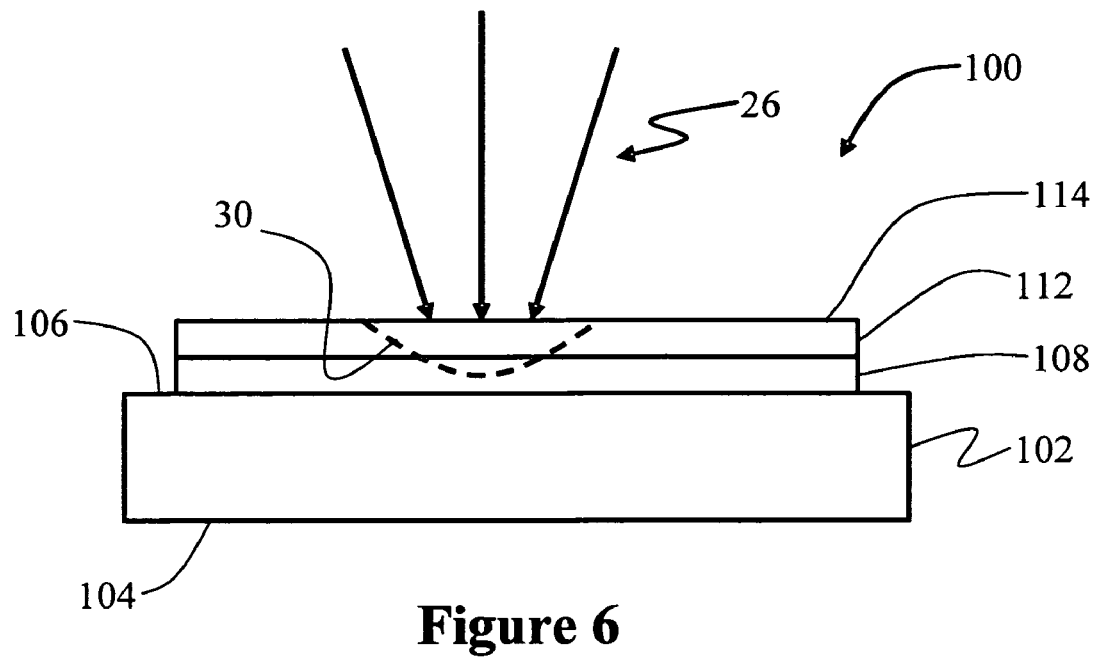
FIG. 6 is a schematic side view of an example embodiment of a layered light-absorbing substrate that includes an light-absorbing base substrate, an organic adhesive layer, and a thin light-absorbing glass layer arranged so that microbumps are formed in the substrate surface when the layered substrate is locally heated.

FIG. 6 is a schematic cross-sectional view of an example embodiment of a layered IR-absorbing substrate 100 capable of forming one or more microbumps for the various micropositioning applications according to the present invention, examples of which are described below. Layered light-absorbing substrate 100 includes a base substrate 102 having a lower surface 104 and an upper surface 106. An example base substrate 102 is an transparent glass such as one of the above-mentioned transparent PYREX glasses. An organic adhesive layer 108 is applied to base substrate upper surface 106. In an example embodiment, organic adhesive layer 108 is or includes an acryl base epoxy. In an example embodiment, organic adhesive layer 108 is on the order of 7 μm thick. In an example embodiment, the thickness of organic adhesive layer 108 is controlled (e.g., to <0.2 μm, if needed) by filling the adhesive with precision diameter microspheres or microrods.

A thin light-absorbing glass layer 112 with an upper surface 114 is then applied to organic adhesive layer 108. In an example embodiment, light-absorbing glass layer 112 is formed from IR-absorbing PYREX glass. In an example embodiment, light-absorbing glass layer 112 is on the order of 90 μm thick. In an example embodiment, the thickness of light-absorbing glass layer 112 is controlled by a precision polishing operation, with typical thickness tolerances of (+/− 10 μm).

An example method of forming microbumps 40 according to the present invention includes forming and providing layered light-absorbing substrate 100, as described above. The method also includes providing heat to a localized area of surface 114 of light-absorbing glass layer 112. In an example embodiment, this is accomplished using light beam 26, as illustrated in FIG. 6. In an example embodiment, light beam 26 is formed using a laser as described above in connection with monolithic light-absorbing substrate 12. In an example embodiment, light beam 26 includes visible, near-IR or IR wavelengths.

As in the previously described example embodiment that employed monolithic light-absorbing substrate 12, the amount of heat introduced into the interior of glass layer 112 decays with distance from glass layer surface 114. As a result, a glass expansion zone 30 is formed within the glass, wherein the temperature change induces a softening of the glass. In an example embodiment, the depth of expansion zone 30 is modified by adjusting the light beam power, the size of beam spot 28, or the duration of irradiation. In another example embodiment, the depth of expansion zone 30 is changed or made selectable by adjusting the concentration of light-absorbing materials in the glass.

Figure 7:
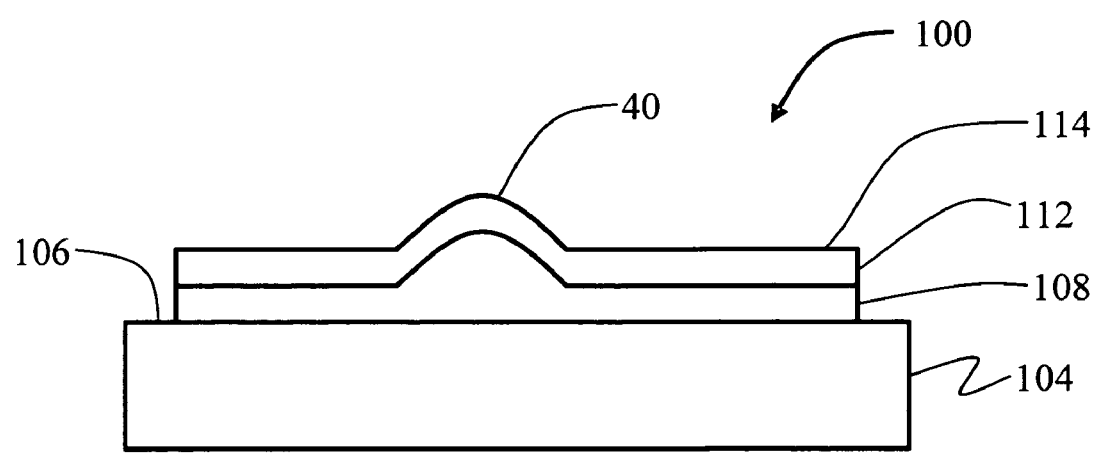
FIG. 7 is a schematic side view of the layered light-absorbing substrate of FIG. 6 after being locally heated to form a microbump.

Expansion zone 30 is made to extend into organic adhesive layer 108, within which the expansion zone acts as a heating zone. While the temperature in this heating zone is typically lower than the temperature of the light-absorbing glass layer 112, local heating in the adjacent organic adhesive layer 108 induces changes in the adhesive mechanical properties of the organic adhesive layer that cause expansion or chemical reactions that produce gas byproducts therein. Because the shape of light beam 26 defines the extent of the expansion/heating zone 30, material expansion and/or gas generation in adhesive layer 108 results in upward pressure on light-absorbing glass layer 112. Since glass layer 112 has already been heated to its softening point via the absorption of irradiation from IR radiation beam 26, the upward pressure caused by the expanding adhesive in adhesive layer 108 causes local deformation of the light-absorbing glass layer 112. This results in the formation of microbump 40, as illustrated in the cross-sectional view of layered light-absorbing substrate 100 of FIG. 7. The surface profile of microbump 40 corresponds to the light beam intensity distribution, with its peak corresponding to the peak intensity of the light beam. As in the previously described example embodiment that employed monolithic light-absorbing substrate 12, in an example embodiment, light beam 26 can be scanned over light-absorbing glass layer surface 114 so as to form microbumps 40 of various shapes and sizes.

In the next step of the method, microbump 40 is fixed by cooling light-absorbing glass layer 112, e.g., by terminating the irradiation of light-absorbing substrate 12. The curved profile of bump 40 enhances the mechanical strength of the microbump and makes it less likely to deform upward or downward under an applied force.

Figure 8:
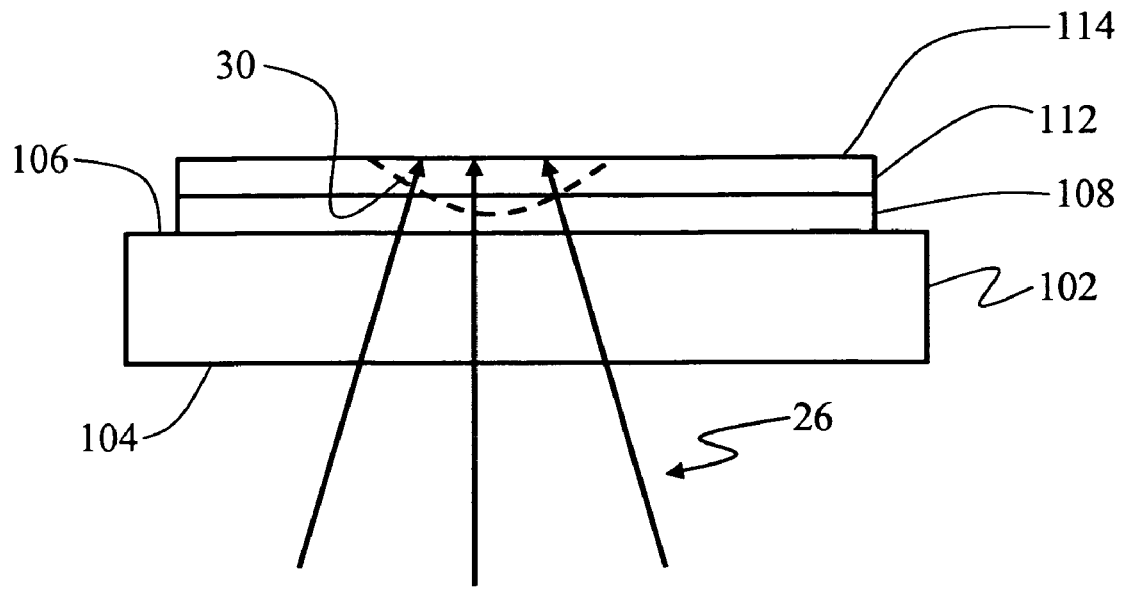
FIG. 8 is a schematic side view of the layered light-absorbing substrate of FIG. 6, illustrating an alternative example embodiment of locally heating the substrate via backside irradiation with a light beam.

The above-described method employs layered light-absorbing substrate 100 and "top-side" irradiation of glass layer 112. This configuration is preferable in cases where base substrate 102 is optically opaque. In an alternate embodiment that employs a transparent substrate 102, bottom-side irradiation is used, as illustrated in FIG. 8.

Microbump Formation Using Joule Heating

In the above example embodiments, heat in the form of an absorbed light radiation beam 26 was provided to light-absorbing substrate 12 or 100 to form a microbump 40. The present example embodiment of microbump formation utilizes Joule heating from a heating element to provide heat to the substrate.

Figure 9:
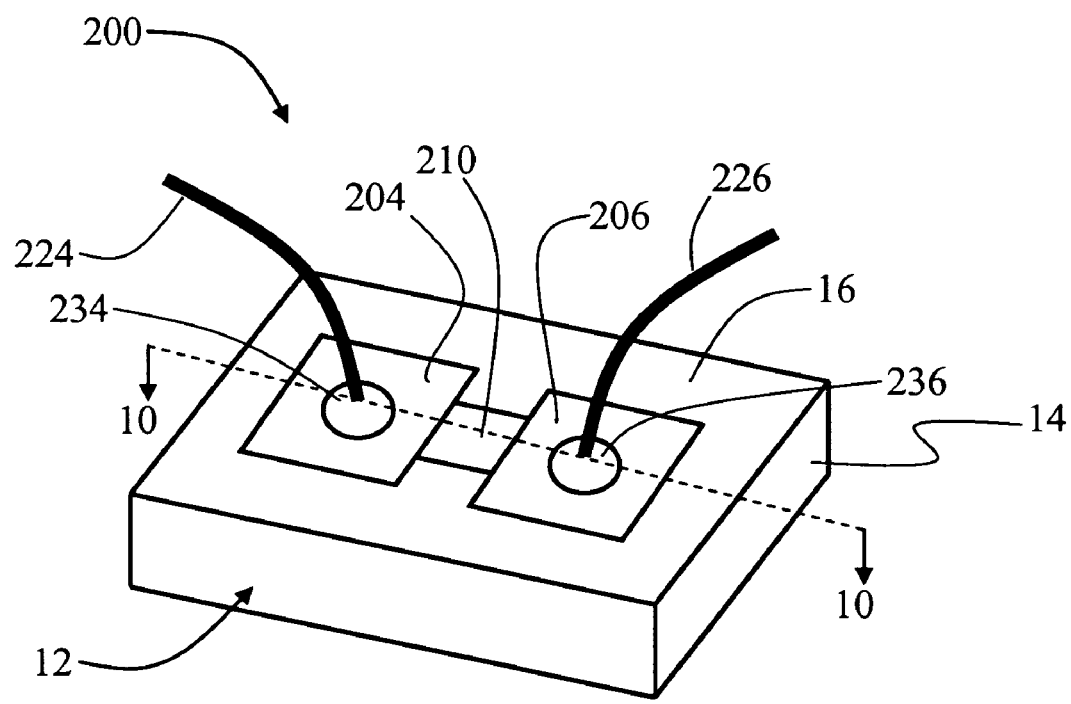
FIG. 9 is an elevated view of a light-absorbing substrate illustrating an example embodiment of locally heating the substrate to form a microbump by applying heat to the substrate via an apparatus that includes a heating element in thermal contact with the surface of the substrate.

FIG. 9 is an elevated view of an example apparatus 200 used to form microbumps in an IR-absorbing substrate such as monolithic light-absorbing substrate 12 (FIG. 1) or layered light-absorbing substrate 100 (FIG. 6). In the present example embodiment, light-absorbing substrate 12 is referred to as an "IR-absorbing substrate" since heat is being applied directly to the substrate.

Figure 10:
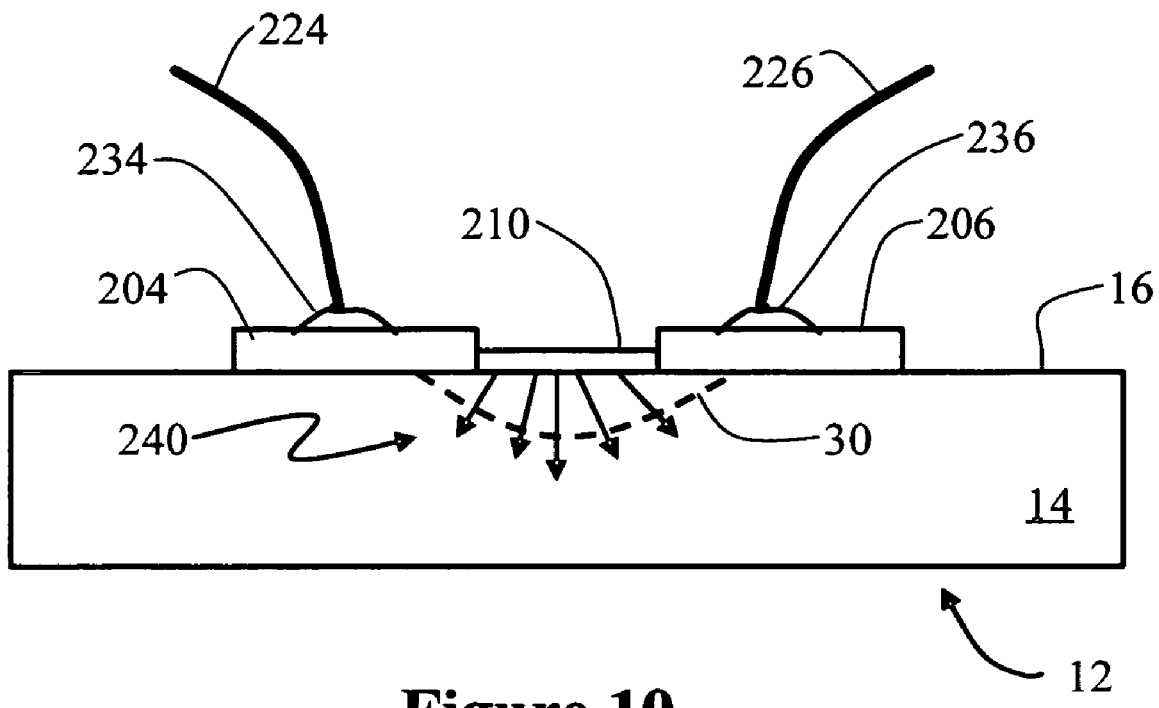
FIG. 10 is a cross-sectional view of the substrate of FIG. 9 taken along the line 10-10, illustrating the formation of the glass expansion zone in the substrate caused by the local heating from the heating element on the substrate surface.

FIG. 10 is a cross-sectional view of apparatus 200 of FIG. 9 taken along the line 10-10. Apparatus 200 includes, in example embodiment, monolithic IR-absorbing substrate 12, though as mentioned above it could equally include layered substrate 100. Apparatus 200 includes two spaced apart metal electrodes 204 and 206 formed on substrate upper surface 16. Electrodes 204 and 206 are electrically joined by an electrically conductive heating element 210 that is sufficiently thin so as to be deformable. Heating element 210 is arranged so as to be thermally coupled to substrate surface 16. In an example embodiment, heating element 210 is arranged on or near substrate surface 16. In an example embodiment, heating element 210 is formed by extending a narrow segment of electrode material between the gap separating the two electrodes. While a simple configuration for the electrodes 204 and 206 and heating element 210 is shown, in other embodiments more complex electrode and heating elements patterns and shapes are employed for confining and focusing heat from the heating element to deliver heat to IR-absorbing substrate 12 in a desired manner.

Apparatus 200 also includes two external wires 224 and 226 bonded to electrodes 204 and 206, respectively, via wire-bond balls 234 and 236, respectively. Electrodes 204 and 206 are formed, for example, by conventional deposition, evaporation or sputtering processes, and patterned, for example, by shadow-masking (during deposition), photolithographic selective etching, a lift-off processes (after deposition), or the like. Typical metals for electrodes 204 and 206 include Au, Pt, Cr, Ni, Mo, Ti, or other common electrode metals or alloys.

An example embodiment of a method of forming one or more microbumps using apparatus 200 includes the step of forming and providing substrate 200 as described above. Next, an electric potential is applied across electrodes 204 and 206 via wires 224 and 226 that causes a current i to flow through heating element 210. Heating element 210 has a relatively high resistance R, so that current i flowing therethrough generates Joule heat 240 in the amount $i^2R$. Heat 240 dissipates into substrate body 14 via conduction. The amount of heat 240 introduced into substrate body 14 decreases with distance from substrate surface 16. As a result, glass expansion zone 30 is created within substrate body 14 where the rapid temperature change induces a dramatic decrease in the substrate density. In an example embodiment, the depth of expansion zone 30 is modified by adjusting the amount of heat 240 supplied by heating element 210, e.g., by changing the amount and duration of the applied current i. The depth of expansion can also be changed or made selectable by adjusting the concentration of IR-absorbing materials in substrate 12.

Figure 11:
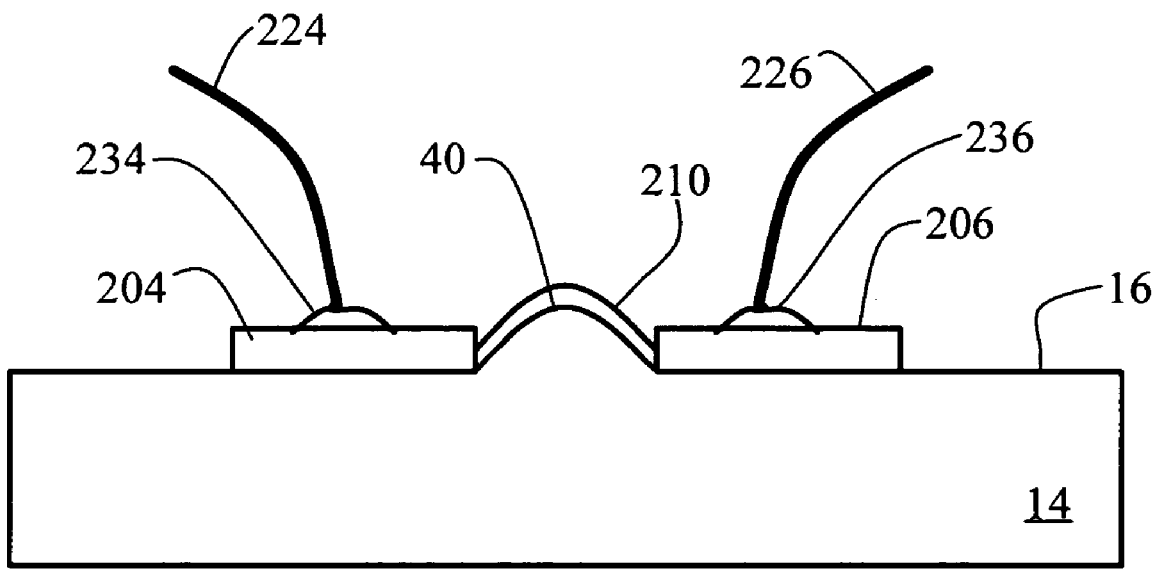
FIG. 11 is a cross-sectional view of the substrate of FIG. 10, illustrating the formation of a microbump under the heating element due to local glass expansion in the glass expansion zone.

Since expansion zone 30 is constrained by unheated (and therefore unexpanded) material of substrate body 14 surrounding the expansion zone, the glass material relieves internal stresses by deforming upward to form microbump 40 beneath heater element 210, as illustrated in FIG. 11. Note that heating element 210 is made thin enough to conformably deform to the shape of microbump 40.

Microbump 40 is then fixed by rapidly cooling the heated area. This rapid cooling is accomplished, for example, by stopping the flow of current i through heating element 210. Once microbump 40 is fixed in place, in an example embodiment wires 224 and 226, electrodes 204 and 206, and heating element 210 are removed using standard microelectronics processes. In an example embodiment, these wires, electrodes and heating elements are kept in place for subsequent use in local thermal curing of substrate adhesives.

Figure 12:
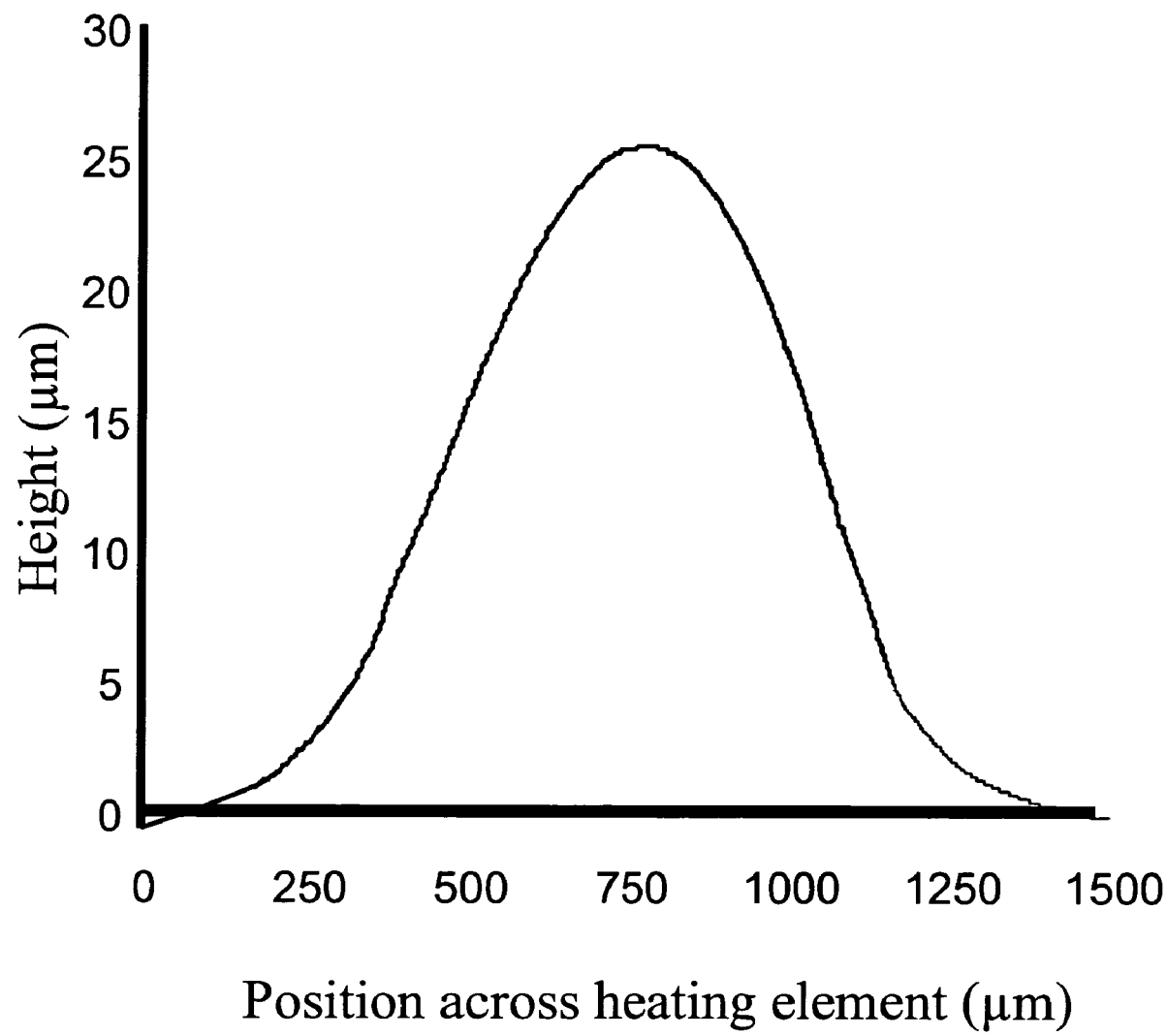
FIG. 12 is a plot of the measured microbump height (um) versus the position across the heating element for a microbump formed as shown in FIG. 11.

FIG. 12 is a plot of the measured height (μm) of a microbump 40 as a function of position (μm) along heating element 210 for an experiment conducted on a substrate 12 formed from an IR-absorbing PYREX glass substrate (Corning code 707ZT). Substrate 12 was metallized with thin film electrodes 204 and 206 formed from ~1100 Å of Pt on a ~300 Å thick Ti adhesion layer. Heating element 210 was formed as a narrow portion of the electrodes and was 1 mm wide. Two electrical probes (serving the role of wires 224 and 226) were positioned on the respective electrodes ~6 mm apart, and an electric potential of 18 V was applied. This resulted in an electrode power dissipation of 9.2 W, and a measured heating element temperature of ~530° C. as measured using a surface contact thermocouple (the actual substrate surface temperature is expected to be higher.) After 2-3 seconds of heating, the electrical interconnection to the electrodes was abruptly broken, allowing the portion of substrate 12 under heater element 210 to cool rapidly. The height of the resulting microbump 40 was measured using a surface profilometer. As evident from the plot of FIG. 12, the maximum height of the resultant microbump 40 was measured at 26 µm, and the shape of the microbump proved to be very symmetrical.

Using heating element 210 to form microbumps 40 simplifies energy dose control since electrode applied voltage and current can be measured directly. In an example embodiment, software is used to control the amount of current and voltage supplied to electrodes 204 and 206 in order to vary the amount of heat supplied to substrate 12 to optimize the microbump formation process. Direct measurement of the temperature of substrate surface 16 is performed, for example, by using heating element 210 as a resistance temperature detector (RTD), enabling accurate closed-loop formation of microbumps 40.

While the electrode-based microbump formation method was described in connection with monolithic IR-absorbing substrate 12, as mentioned above, it is also directly applicable to layered substrate structure 100 described above in connection with FIGS. 6 through 8. Also, while electrodes 204 and 206 and heating element 210 have been shown deposited directly on upper surface 16 of IR-absorbing substrate 12, in an alternative embodiment, the electrodes and heating element are formed on a separate substrate that is temporarily or permanently positioned in close proximity to or in contact with the IR-absorbing substrate.

In an example embodiment, multiple electrodes and heating elements are formed on the same substrate surface. This allows for more complex micropositioning platforms and circuits to be fabricated, with standardized patterns for temporary or permanent electrical interconnection (via wirebonding or in situ probing) so as to allow for the formation of multiple microbumps 40, e.g., in a regular pattern and optionally of different shapes and sizes. Multiple microbumps 40 serve to simplify alignment of the microbumps to other substrates or optical components, since the relative locations of the microbumps are determined by the electrode patterning. The ability to fabricate multiple electrodes 204 and 206 on the same glass substrate also allows for cost-reduced manufacture of heating elements 210. In an example embodiment, a single metallized IR-absorbing glass substrate is formed with multiple electrodes and heating elements, and then diced to yield hundreds or thousands of smaller IR-absorbing substrates 12 or 100 that serve as micropositioning chips.

Microbump Micropositioning Methods and Applications

In an example embodiment of the present invention, microbumps 40 created using the methods described are used as precision standoffs for rapid micropositioning of optical elements. In an example embodiment, an optical element is micropositioned by "shimming" it into place either actively, i.e., while measuring the amount of power coupled through a coupling interface, or semi-passively, i.e., by measuring the optical elements before or during assembly and then constructing one or more judiciously placed and sized microbumps (in situ or off-line) to compensate for vertical and lateral misalignments.

For example, low-loss coupling of high-index waveguide cores (with mode field diameters of ~4 µm) requires that lateral misalignments be controlled to within 0.1-0.2 µm. The range of vertical lateral adjustment that must be provided depends on the specific components involved in hybrid integration, but typical values range from 20 to 100 µm, depending on the particular application. For example, thin-gap micropositioning applications might be, for example, in the 10 to 30 µm range. The range of values is due in part to uncertainties in substrate thickness and variations in substrate stack-up height due to solder layer thickness differences.

Optical Fiber Micropositioning on a Substrate

Figure 13:
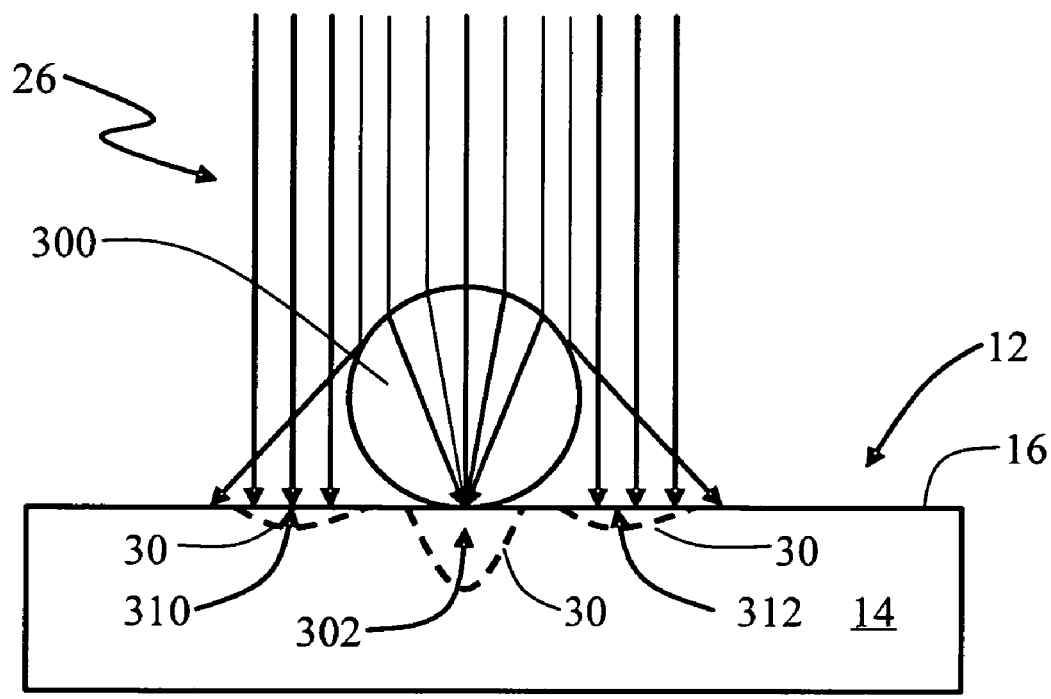
FIG. 13 is a side view of a light-absorbing substrate that supports an optical fiber as seen end-on, illustrating a step in an example method of micropositioning an optical fiber by forming a microbump in the substrate beneath the optical fiber.

In an example embodiment of the present invention, microbumps 40 formed on a light-absorbing substrate are used to vertically position optical fibers for in-situ micropositioning relative to other waveguides or to another optical component of an optical assembly. FIG. 13 is a side view of light-absorbing substrate 12 with an optical fiber 300 (as viewed end-on) positioned on substrate surface 16 prior to microbump formation. Other waveguides or additional components required for lateral alignment of the optical fiber in the direction parallel to the plane of substrate 12 (i.e., horizontally) are not shown in FIG. 13 for ease of illustration. In the present example embodiment, optical fiber microposition in the lateral (horizontal) direction is provided either by active alignment devices (e.g., piezo-electric micropositioning) or by passive alignment structures (e.g., polymer grippers or V-groove structures).

The method of micropositioning optical fiber 300 in the vertical direction includes the step of providing light beam 26 and directing it onto the optical fiber as shown in FIG. 13. Since optical fiber 300 is essentially transparent to visible, NIR and IR wavelengths associated with light beam 26, the light beam travels through (i.e., across) the optical fiber and impinges upon substrate surface 16. The circular cross-section of optical fiber 300 acts as a lens and focuses a portion of IR radiation beam 26 onto surface 16 at a substrate region 302 directly beneath the optical fiber. Depending on the diameter of light beam 26 relative to the diameter of the optical fiber, substrate absorption and heating may also occur in substrate regions 310 and 312 on either side of optical fiber 300. Expansion zones 30 are shown for each irradiated region 302, 310 and 312. Also note that a small portion of light beam 26 is reflected from the optical fiber surface so that it strikes substrate surface 16 at an angle.

Figure 14:
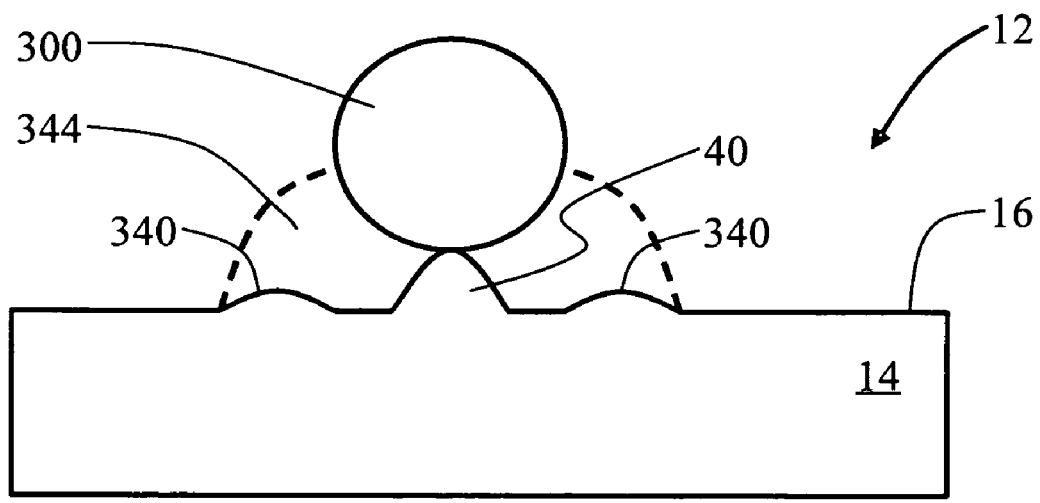
FIG. 14 is the side view of the substrate and fiber of FIG. 13, showing the microbump formed in the substrate directly beneath the optical fiber, as well as secondary microbumps formed on either side of the optical fiber due to the deflection of the radiation beam by the optical fiber, and also showing a support member holding the optical fiber in place.

Heating substrate region 302 results in the formation of a microbump 40, as shown in FIG. 14. Secondary microbumps 340 may also be formed on substrate 12 at irradiated regions 310 and 312, depending on the amount of heat generated in these regions. Microbump 40 acts to push optical fiber 300 vertically, i.e., away from substrate surface 16. A microbump 40 so formed allows for the micropositioning of optical fiber 300. In an example embodiment of the method, a support member 344 (dashed line), which may include a fixturing structure or an adhesive bead, is used to hold optical fiber 300 in its new vertical position supported by microbump 40.

Optical Fiber Micropositioning in a Substrate V-groove

In some hybrid integration applications, it is sometimes desirable to microposition an array of planar waveguides formed on a planar waveguide substrate relative to another array of planar waveguides or an array of optical fibers. A typical micropositioning approach involves bonding one or more optical fibers into a fiber array block (e.g., an Si or glass substrate with precision machined or etched V-grooves), and then bonding this fiber array block directly to a planar waveguide substrate using organic adhesives. This approach is well-suited for coupling to planar waveguides that support mode fields with diameters similar to the mode field diameter of typical single-mode optical fiber. In cases where the planar waveguide dimensions are smaller (e.g., 4 μm×4 μm), low-loss coupling requires mode field converter structures on the substrate (e.g., tapers) or on the fiber ends (e.g., fiber lenses). In either case, lateral alignment tolerances for the optical fiber array may become so demanding that typical fiber eccentricity errors (due either to fiber core eccentricity or to limitations in V-groove sidewall positions) are unacceptable. Even if eccentricity errors can be managed, fiber lens pointing errors can result in equivalent lateral misalignments that introduce unwanted coupling losses.

Figure 15:
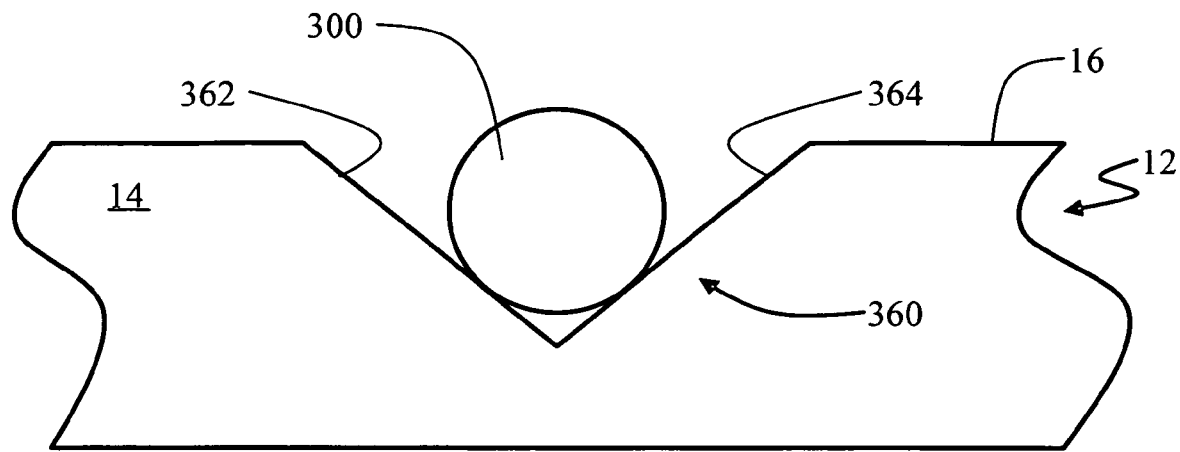
FIG. 15 is a side view of a light-absorbing substrate that has a V-groove formed therein that supports a portion of the optical fiber along its length.

To avoid these sources of optical fiber misalignment, another approach is to individually align each fiber to its corresponding planar waveguide using an active alignment process. FIG. 15 is a close-up side view of a light-absorbing substrate 12 with two angular sidewalls 362 and 364 formed in substrate surface 16 that define elongated V-groove 360. Optical fiber 300 is supported along its length in the V-groove and is shown end-on in FIG. 15.

Figure 16:
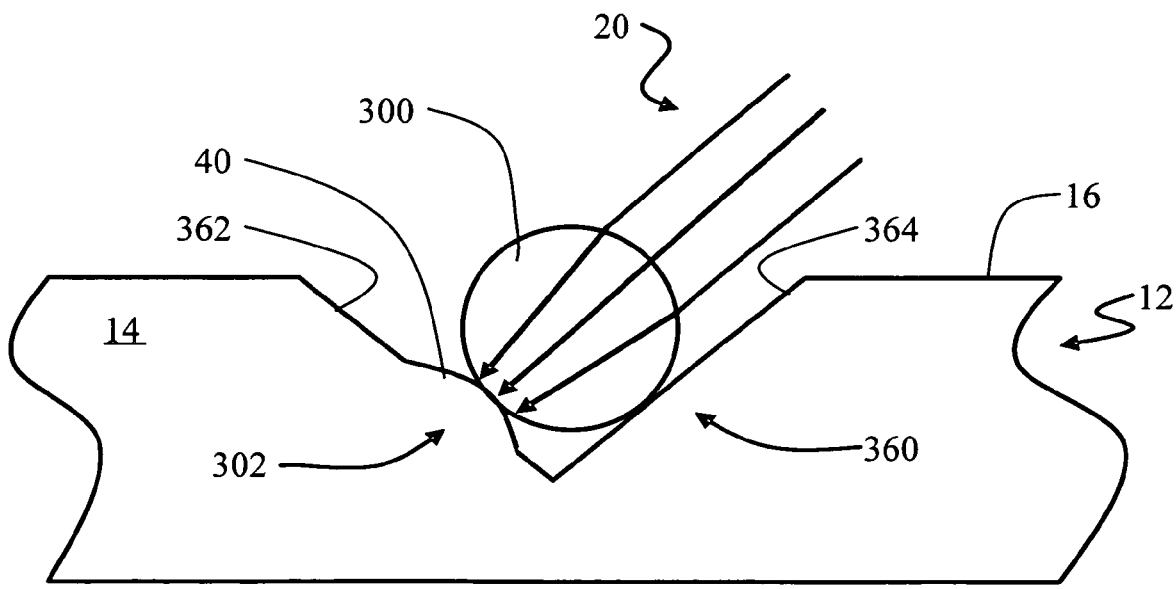
FIG. 16 is the side view of the substrate of FIG. 15, showing how one surface of the V-groove is locally heated to form a microbump thereon by irradiating the surface through the side of the optical fiber so as to microposition the optical fiber within the V-groove.

An example embodiment of a method of micropositioning optical fiber 300 in V-groove 360 includes providing the light-absorbing substrate and V-groove, and arranging an end portion of the optical fiber therein as described above. The method also includes micropositioning an end portion of optical fiber 300 within V-groove 360 by directing light beam 26 through the side of the optical fiber from the upper right, as shown in FIG. 16. Optical fiber 300 focuses light beam 26 to region 302 where the optical fiber contacts sidewall 362. The resultant heating causes a microbump 40 to form in sidewall 362. Microbump 40 acts to shift the position of optical fiber 300 within V-groove 360 upward and rightward in FIG. 16.

Figure 17:
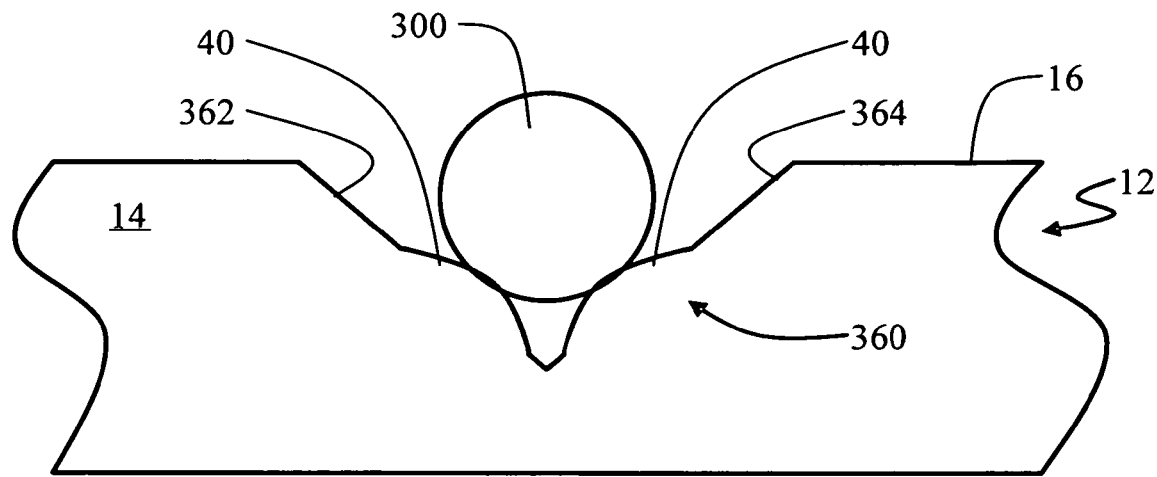
FIG. 17 is a side view of the substrate of FIG. 16, showing the formation of two microbumps to microposition the optical fiber within the V-groove.

In an example embodiment of the present method, the above irradiation process is repeated but in the opposite direction so that sidewall 364 is irradiated through optical fiber 300, forming a second microbump 40 in sidewall 364. This moves optical fiber 300 upward and leftward. As long as the height of microbump is small compared with its base width, the degree of cross-coupling of motion to the upper right in this step should be limited. The outcome of this process is illustrated in FIG. 17. In an example embodiment, microbumps 40 are made the same size, with the overall result that optical fiber 300 is moved only vertically relative to its initial position within V-groove 360.

Optical fiber 300 remains in position within V-groove 360 as determined by the height microbumps 40 on sidewalls 362 and 364. In an example embodiment of the method where additional optical fiber micropositioning is required, microbumps 40 are reheated to change their height. This optical fiber alignment approach has the advantage that it can align fiber arrays on relatively fine pitches (e.g., a 250 μm pitch). Other approaches for fiber alignment on a fiber-by-fiber basis generally require additional fixturing hardware, blocks or clips to hold the fiber in place after displacement.

In an example embodiment wherein one microbump 40 is too high so that optical fiber 300 is not properly micropositioned, the problem is corrected by heating the higher microbump in order to make it smaller, e.g., to match the height of the other microbump.

Optical Fiber Micropositioning in a Substrate Groove

Another example embodiment of a method of micropositioning an optical fiber involves constraining the optical fiber at one or more points along its length and then using microbumps formed on the walls of a groove to control the position of an end of the optical fiber.

Figure 18:
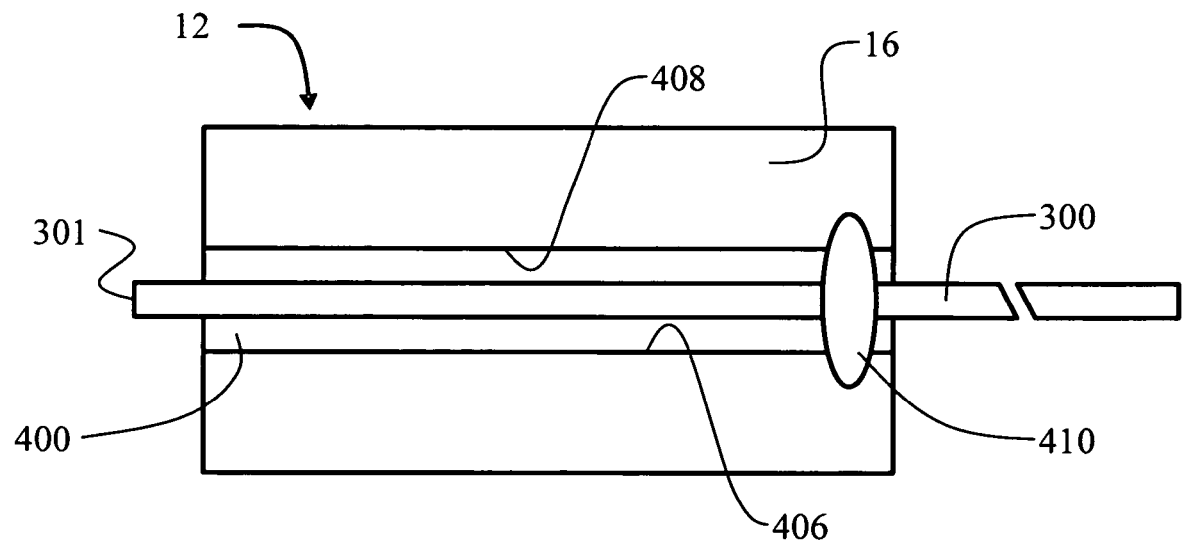
FIG. 18 is a plan view of a light-absorbing substrate that has a groove formed therein and in which a portion of an optical fiber is supported in cantilever fashion by an adhesive bead at one end of the groove.

FIG. 18 is a schematic diagram showing a plan view of a light-absorbing substrate 12 that has a central groove 400, such as V-groove 360 of FIG. 17, or a U-shaped groove, formed in substrate upper surface 16. Groove 400 includes opposite surface portions 406 and 408. Optical fiber 300 has an end 301 and is supported along a portion of its length by groove 400. The end portion of optical fiber 300 is held in the groove using, for example, an adhesive bead 410 near one end of the groove. This cantilever arrangement allows optical fiber 300 to pivot about the point where it is held by adhesive bead 410 so that free end 301 can be micropositioned.

Figure 19:
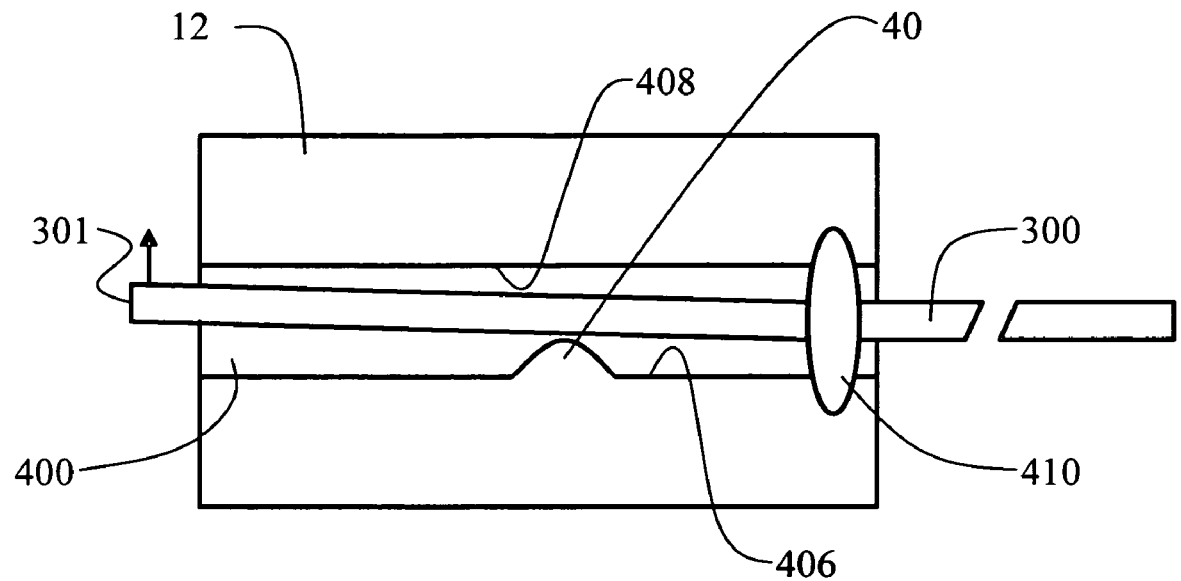
FIG. 19 is a plan view of the light-absorbing substrate and optical fiber of FIG. 18, wherein a microbump is formed on one of the groove walls to microposition the free end of the optical fiber via deflection.

With reference now to FIG. 19, in an example embodiment of a method for micropositioning optical fiber end 301, once the above-described arrangement is provided, a microbump 40 is formed on one of groove surface portions 406 or 408 using one of the above-described microbump formation methods. As heat is provided to one of the groove surfaces—say, surface 406—microbump 40 grows to contact the optical fiber, causing an upward deflection of optical fiber end 301, as indicated by the vertical arrow shown at the optical fiber end.

Figure 20:
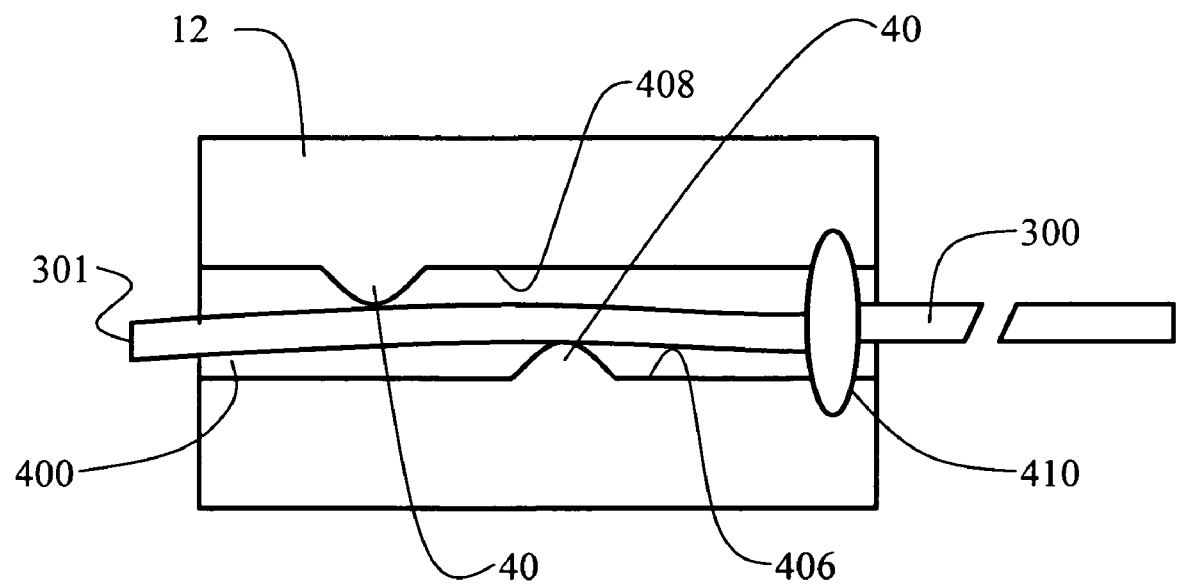
FIG. 20 is a plan view of the light-absorbing substrate and optical fiber of FIG. 19, wherein a second microbump is formed on the opposite wall of the first microbump to further microposition the free end of the optical fiber.

If this upward deflection is larger than desired, then in an example embodiment of the method, a second microbump 40 is formed on the opposite groove surface 408, at a location between the first microbump and optical fiber end 301, as illustrated in FIG. 20. Second microbump 40 causes optical fiber end 301 to deflect downward. If the downward deflection is too large, then additional microbumps can be created on the appropriate groove surface in order to reposition the optical fiber.

In an example embodiment similar to that illustrated in FIG. 20, second microbump 40 on surface 408 is positioned between first microbump 40 and adhesive bead 410 to introduce an additional upward deflection of free optical fiber end 301.

Substrate Micropositioning of Optical Elements

If the accuracy of microbump formation and characterization processes is sufficient, then optical elements such as planar waveguide substrates can be passively micropositioned to one another using microbumps. On the other hand, metrology, material or process limitations can cause the substrate characterization or microbump formation process to fall short of a required micropositioning tolerance (e.g., an offset tolerance $d_T \leq 0.2$ μm). Accordingly, an example embodiment of the present invention includes a method of performing active micropositioning of a planar optical component such as a planar waveguide substrate.

Figure 21:
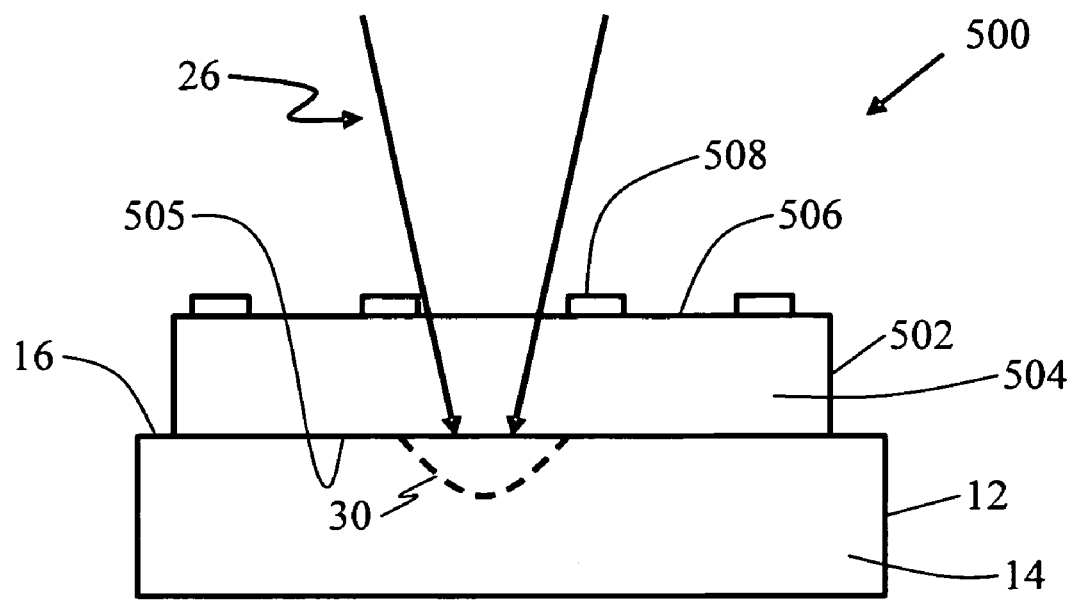
FIG. 21 is a schematic side view of a planar waveguide assembly that includes a transparent planar waveguide substrate arranged atop a light-absorbing substrate as a support member, showing how the light-absorbing substrate is irradiated through the transparent substrate in order to locally heat the light-absorbing substrate as part of the process of micropositioning the planar waveguide substrate.

FIG. 21 is a schematic side view of an example planar waveguide assembly 500 that includes a light-absorbing substrate 12. Positioned atop light-absorbing substrate surface 16 is an transparent planar waveguide substrate 502 having a body 504, a lower surface 505 and an upper surface 506. An array of planar waveguides 508 resides upon upper surface 506. An example of a transparent planer waveguide substrate is a silicon-on-glass (SOG) structure, wherein silicon waveguides with thicknesses of up to 4-5 μm are fabricated on a Silicon CTE-matched glass substrate, such as PYREX 7740 or Corning code 1737, as described in PCT patent publication serial no. WO 2005029576.

In micropositioning planar waveguide substrate 502 relative to light-absorbing substrate 12 in planar waveguide assembly 500, one or more microbumps 40 is/are formed using one of the above-described microbump-forming methods. The microbump formation method that uses light beam 26 in combination with a monolithic light-substrate 12 is used here for the sake of illustration, as is monolithic substrate 12 (layered substrate 100 can be used as well, as can heating element 210 for delivering heat to the substrate).

Figure 22:
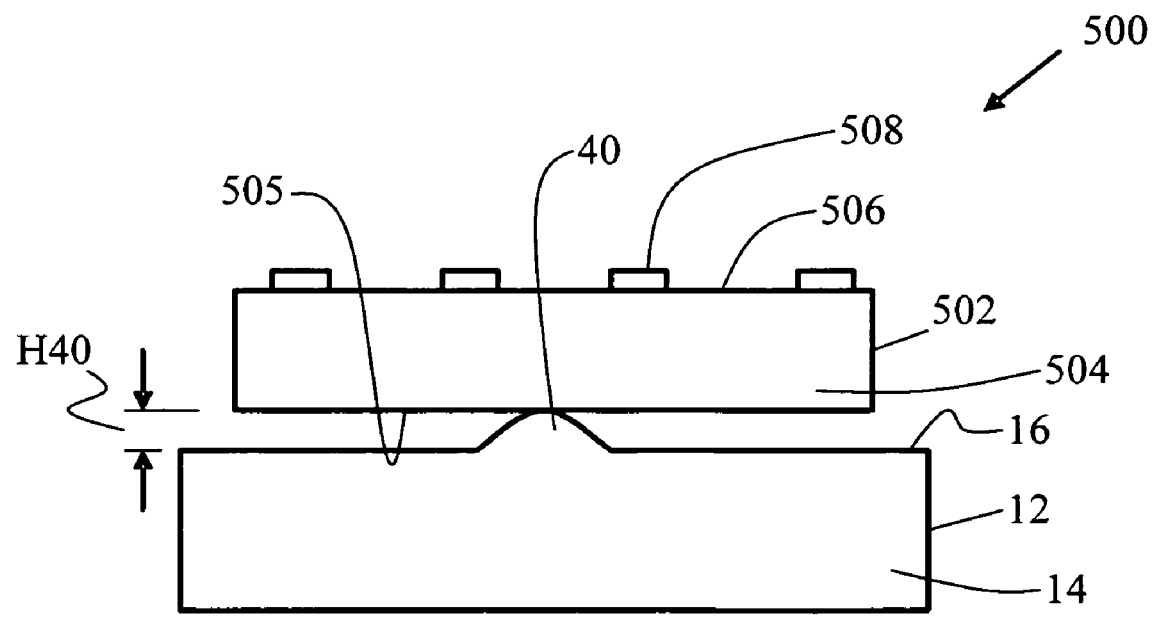
FIG. 22 is a schematic side view of the planar waveguide assembly of FIG. 21, but showing a microbump formed in the underlying light-absorbing substrate due to the local heating of the substrate, wherein the microbump serves to microposition the planar waveguide substrate.

The method of micropositioning planar waveguide substrate 502 includes providing planar waveguide assembly 500 of FIG. 21. The next step of the method includes directing light beam 26 through substrate upper surface 506, through substrate body 504 and through substrate lower surface 505 to irradiate a portion of IR-absorbing substrate upper surface 16. The light from light beam 26 is absorbed by substrate 12 and locally heats substrate body 14, resulting in the creation of expansion zone 30, as described above. In response thereto, substrate 12 locally expands in the irradiated region to form microbump 40, as illustrated in FIG. 22. Microbump 40 acts to vertically displace planar waveguide substrate 502 in proportion to the amount of light provided to the substrate. In an example embodiment, bottom-side irradiation, such as described in connection with FIG. 8, is employed through one or more transparent device or alignment substrates in fabricating assembly 500.

In an example embodiment of the method, the height of microbump 40 is increased by applying additional heat to the microbump. This technique can be used, for example, to nudge optical components into place, with alignment feedback provided via direct measurement of the height of IR-transparent substrate 502 or active measurements of coupled optical power between waveguides.

The inventors carried out micropositioning experiments by using the above-described method. In the experiments, a polished piece of PYREX 901AWE glass was used as a monolithic IR-absorbing substrate 12. Further, PYREX 1737 glass was used for (IR) transparent planar waveguide substrate 502. A focused light beam 26 having a NIR wavelength of 810 nm and a beam spot 28 of ~400 μm diameter was directed through IR-transparent substrate 502 to light-absorbing substrate 12 in a series of one second pulses. With laser power at 3.36 W, 3.36 J of energy was delivered to light-absorbing substrate 12 in each pulse. The number of pulses delivered to a single location was varied from 1 to 8. Microbumps of ~9 μm were measured. It was also observed that more energy was needed to form the microbumps in the presence of the IR-transparent substrate than in its absence. This is most likely due to the extra thermal mass presented by the IR-transparent substrate.

Active Micropositioning

A variety of arrayed optoelectronic components require alignment of active and passive planar waveguide substrates. For example, a high-speed waveguide optical detector substrate requires alignment between detector waveguides and passive waveguides (e.g. a passive planar waveguide substrate or an optical fiber array). Another hybrid active/passive integration application is the high speed wavelength-selective optical switch. Multiple wavelength channels on an optical input signal are coupled to a 1×N demultiplexing device, where they are demultiplexed into individual waveguides. Each waveguide is directed to its own optical amplifier on an SOA substrate. The SOA amplifiers are configured so that only one is active at a time, blocking all wavelengths but the wavelength in the selected amplifier. The selected wavelength is amplified and coupled to the output waveguide with low loss using an N×1 multiplexing device.

In practical systems, the SOA, demultiplexing and multiplexing functions are implemented using separate planar waveguide substrates. As mentioned above, the difficulty with aligning the SOA waveguide array to a passive planar waveguide array is that they cannot be bonded directly together (as with fiber pigtail blocks). Additionally, any substrate alignment solution must also accommodate the SOA's high speed electrical interconnection needs and thermal dissipation requirements.

Figure 23:
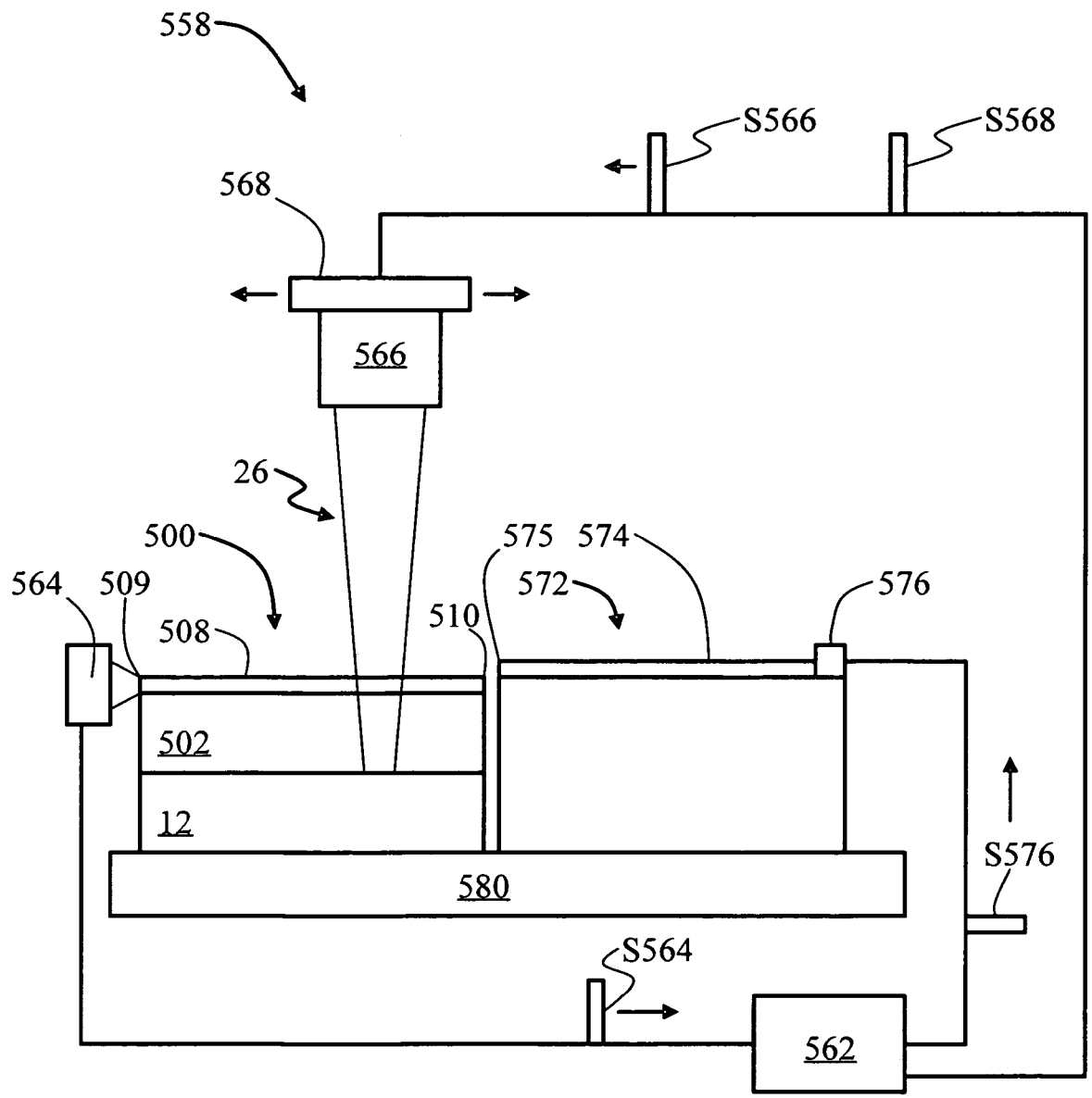
FIG. 23 is a schematic diagram of the planar waveguide assembly of FIG. 21 interfaced with a second planar waveguide assembly, wherein both planar waveguide assemblies are arranged in an example apparatus used for actively micropositioning the two planar waveguide assemblies.

FIG. 23 is a plan view of an example apparatus 558 used to perform active micropositioning of two waveguides. Apparatus 558 includes a controller 562, such as a computer, operably coupled to a detector unit 564 and an IR radiation source 566. IR radiation source 566 is supported by a movable stage 568, which is operably coupled to controller 562. Planar waveguide assembly 500 of FIG. 21 is arranged in apparatus 558 immediately alongside a second planar waveguide assembly 572 that has an array of planar waveguides 574 and a light source unit 576 optically coupled to each waveguide in the array. Second planar waveguide assembly 572 may be, for example, an SOA array, wherein light source unit 576 includes an optical amplifier for each waveguide 574 that receives and amplifies light from a third planar waveguide assembly (not shown). In an example embodiment, first waveguide assembly 500 and second waveguide assembly 572 are mounted on a common substrate 580 with ends 509 of waveguides 508 roughly aligned with ends 575 of waveguides 574 that are opposite light source 576. Ends 510 of waveguides 508 optically coupled to detector unit 564. IR radiation source 566 is adapted to generate an IR-wavelength light beam 26 and is movable via stage 568 so that the IR-radiation light beam can be delivered to a select portion of waveguide assembly 500, as discussed above in connection with FIGS. 21 and 22.

The active micropositioning method of the present invention includes initially positioning structure 500 and second planar waveguide structure 572 relative to one another until waveguides 508 and 574 are roughly aligned using, for example, a vision system or kinematic alignment of one or more chip features (e.g., precision cleaved or etched edges, mesa, trenches or other structures) to a reference structure integral to the positioning structure. The method then includes activating light source unit 576 via an activation signal S576 generated by controller 562 to cause the light source unit to send light through one of waveguides 574. Some or most of this light is coupled to the corresponding waveguide 508 in planar waveguide substrate 502. The method then includes measuring the amount of light (power) exiting waveguide 508 using detector unit 564, which sends a detector signal S564 to controller 562 corresponding to the amount of light detected. Based on the amount of light measured by detector unit 564, controller 562 positions IR radiation source 566 by moving stage 568 to a select position via a control signal S568.

Figure 24:
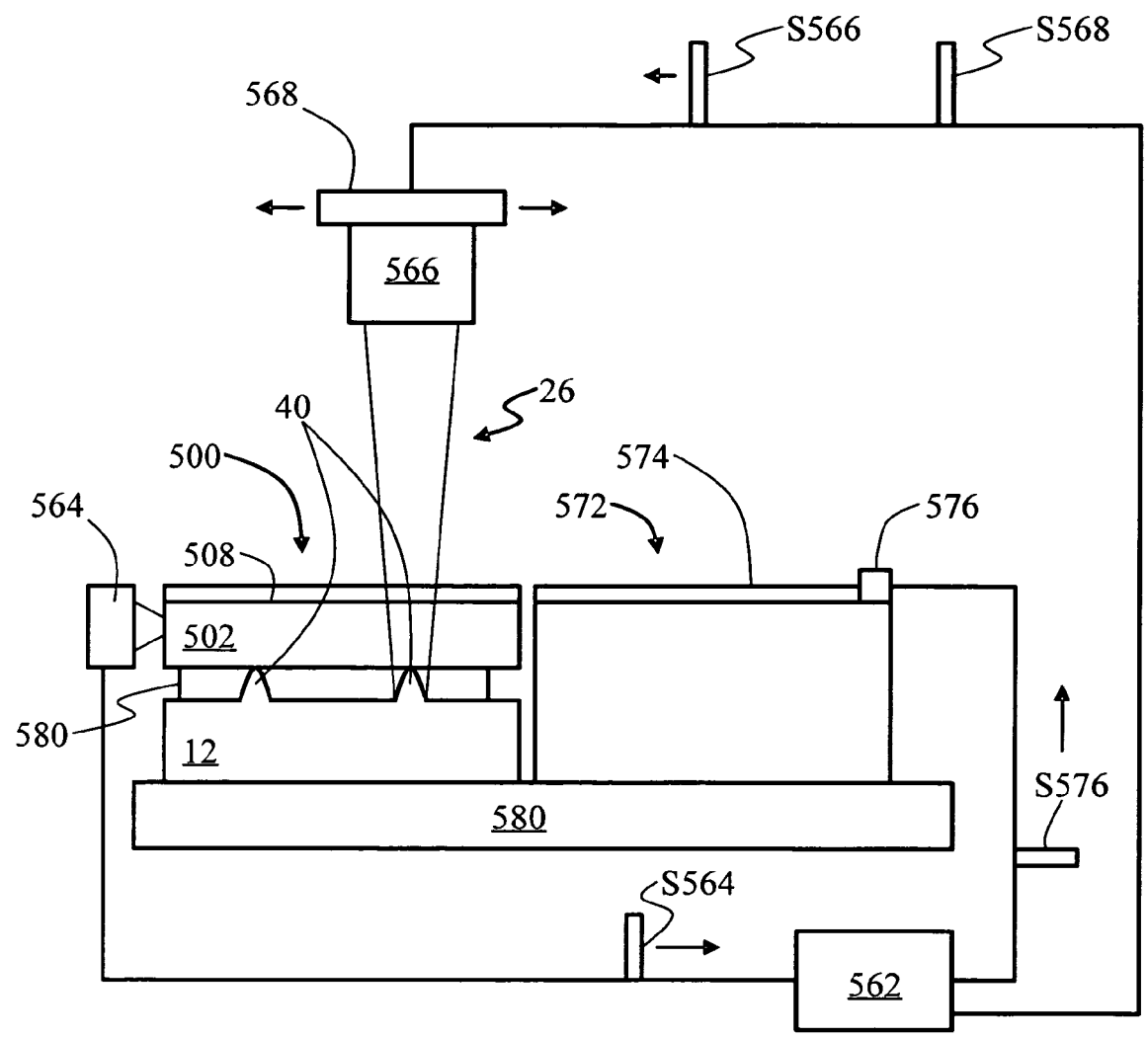
FIG. 24 is a schematic diagram of the apparatus of FIG. 24, showing the formation of microbumps as part of the active micropositioning method of the two planar waveguide assemblies.

Next, controller 562 then activates IR radiation source 566 via an activation signal S566 to generate IR-wavelength light beam 26, which irradiates waveguide assembly 500 in the manner described above to form microbumps 40. The microbumps then raise the IR-transparent planar waveguide substrate 502, as illustrated in FIG. 24.

It should be noted here that one of the other methods of proving localized heat (IR) energy to light-absorbing substrate 12 can be used, such as the use of heating elements as described in connection with FIGS. 9-11.

The repositioned planar waveguide substrate 502 changes the amount of optical power coupled into waveguides 508. This change is measured by detector unit 564 and is used to guide subsequent changes in microbump height via repeated irradiation with IR-wavelength beam 26. The method is iterated until the coupled power feedback reaches a threshold or maximum value, at which point the microbump formation process is terminated. The method then includes injecting a thermal cure adhesive 580 into the gap between planar waveguide substrate 502 and light-absorbing glass substrate 12. Additional IR heating from IR-wavelength beam 26 provides a short-term adhesive bond. As before, this adhesive is fully cured after assembly in a longer-term thermal cure process. An advantage of this micropositioning method is that it ensures that a relatively thin layer of adhesive joins optical components, minimizing the amount of misalignment due to post-cure shift and CTE-induced deformation effects.

Optical Assembly with Microbump Micropositioners

Figure 25:
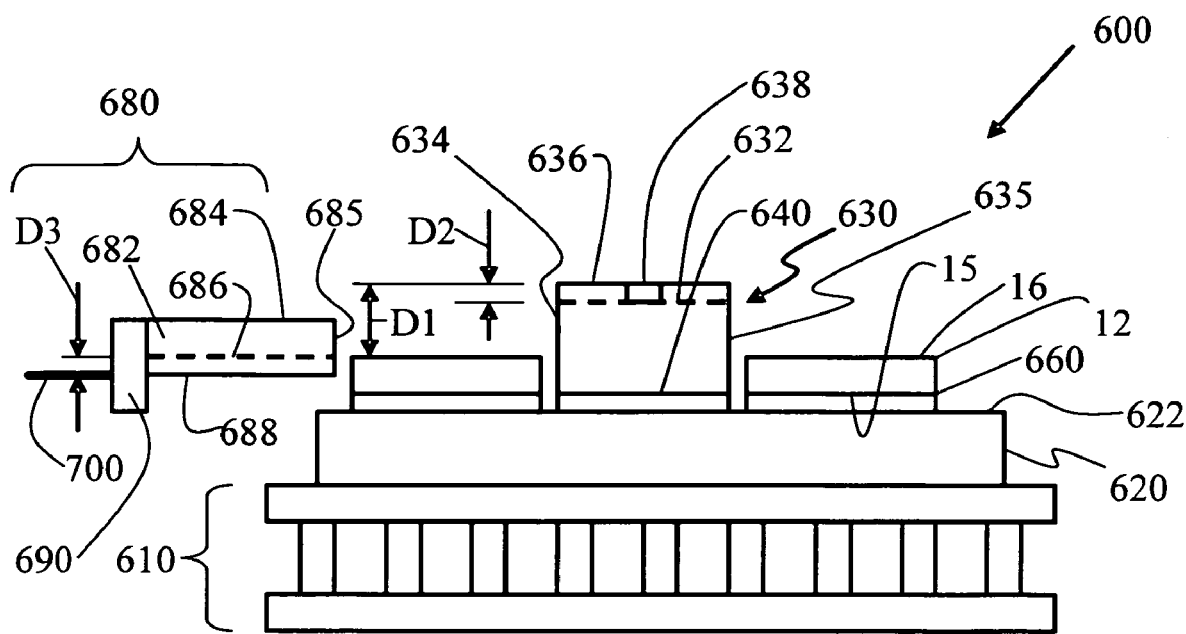
FIG. 25 is a schematic side view of an example embodiment of a structure formed in the process of fabricating an optical assembly in the form of a waveguide-selective switch (WSS), illustrating three different offsets relating to micropositioning first and second planar waveguide assemblies to a central SOA.

An example embodiment of the present invention includes an optical assembly formed using microbump micropositioners. FIG. 25 is a side view of a first structure 600 on the way to forming an optical assembly 800 in the form of a wavelength selective switch (WSS). Structure 600 includes a thermo-electric cooler (TEC) 610 that supports a thermally conductive alignment substrate 620 having an upper surface 622. In an example embodiment, alignment substrate 620 is formed from AlN or CuW and is pre-patterned with an array of high-speed electrical interconnection metallization (not shown).

Structure 600 also includes an SOA substrate 630 having an upper surface 632, and opposite outer edges 634 and 635. SOA substrate 630 includes an array of waveguides 636 formed atop upper surface 632 and that extend from edge 634 to edge 635. Each waveguide 636 includes an active section 638 that acts as an optical amplifier when electrically pumped by an injection current. Active sections 638 can also act as an optical switch by turning on and off a bias current supplied thereto. SOA substrate 630 is fixed to alignment substrate 620 using, for example, a solder preform 640 that electrically connects the SOA substrate to the alignment substrate metallization.

After solder reflow, the functionality of SOA substrate 630 is verified via direct electrical probing of alignment substrate 620 or after making wirebond connections between the SOA substrate and the alignment substrate electrical interconnection metallization.

Once SOA functionality is confirmed, a thin light-absorbing glass substrate 12 is attached to upper surface 622 of alignment substrate 620 on either side of SOA substrate 630. light-absorbing glass substrate 12 can be attached to the substrate in a number of ways, and in an example embodiment is attached using a thin adhesive layer 660 that include an organic adhesive, the thickness of which is controlled using, for example, microspheres or microrods of uniform diameter.

In an example embodiment, the lower surface 15 of light-absorbing glass substrate 12 is metallized with a solderable material. If the alignment substrate is not directly solderable, then the same metallization used to create electrical interconnections with the SOA substrate solder bonding area is used to provide a soldering pad for the light-absorbing glass layer 12. In this embodiment, a solder preform is mounted between light-absorbing glass substrate 12 and alignment substrate 620, and the glass layer is bonded to the alignment substrate surface 622 during a reflow operation. In an example embodiment, this reflow operation is the same as the reflow used to bond SOA substrate 630 to the alignment substrate and/or the alignment substrate to TEC 610. In other example embodiments, light-absorbing glass substrate 12 is anodically bonded to alignment substrate surface 622 or is applied to the alignment surface in the form of a glass frit. This frit is then consolidated by firing prior to the first solder reflow step, or by selective laser heating.

After light-absorbing glass substrates 12 are firmly attached to alignment substrate surface 622, a characterization step is performed to determine the height of SOA substrate 630 relative to surface 16 of each light-absorbing glass layer 12. The distance D1 represents the offset between upper surface 16 of light-absorbing glass layer 12 and upper surface 632 of SOA substrate 603. The distance D2 represents the offset between upper surface 16 of light-absorbing glass layer 12 and the middle of waveguides 636 in SOA substrate.

Offset D1 is measured using with sub-micrometer accuracy using, for example, non-contact methods such as white light optical interferometry or scanning laser confocal microscopy. While only a single offset D1 is shown in FIG. 25, in an example embodiment, a number of offset measurements for D1 are made at multiple locations. These measurements are then used to determine the surface planes for upper surface 16 of light-absorbing glass layer 12 and SOA substrate upper surface 632.

A separate measurement is required to accurately determine offset D2. In an example embodiment, offset D2 is determined either directly through SEM characterization of overclad thickness or indirectly using process feedback metrology during overclad deposition.

Also shown in FIG. 25 is a planar waveguide assembly 680 to be integrated into structure 600. Planar waveguide assembly 680 includes a waveguide substrate 682 having a lower surface 684, a leading edge 685, and an upper surface 686 upon which waveguides 688 are formed. The reason why lower surface 684 is above upper surface 686 in FIG. 25 is because planar waveguide assembly 680 is actually shown in an upside-down orientation in anticipation of being incorporated into microoptical assembly 800 in this orientation.

Waveguide assembly 680 also includes a pigtail block 690 operatively attached to waveguide substrate 682 and that includes an input optical fiber 700. Pigtail block 690 serves to optically couple input optical fiber 700 to the various waveguides 688 that form a waveguide array. An offset D3 is measured between substrate lower surface 684 and the middle of waveguides 688. Offset D3 is measured in a similar manner to as offset D2.

Figure 26:
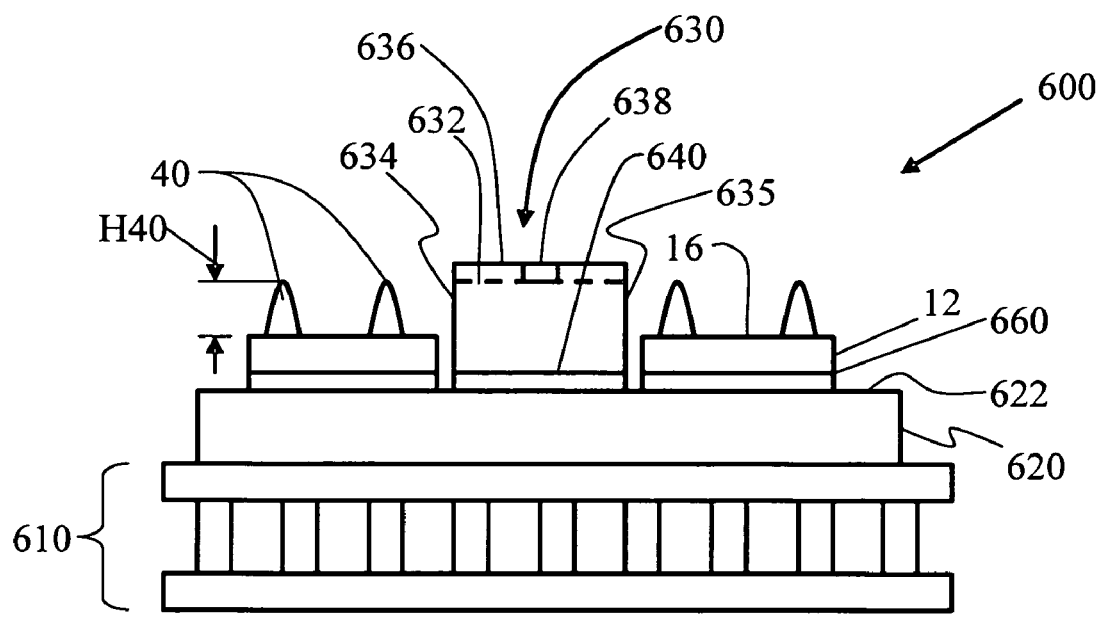
FIG. 26 is the same schematic side view as FIG. 25, further including microbumps formed on first and second light-absorbing substrates on opposite sides of the SOA so as to microposition the planar waveguide assemblies relative to the SOA.

With reference now to FIG. 26, using offset measurements D1–D3, microbumps 40 of height H40 are formed on light-absorbing glass substrate 12 using one of the above-described microbump formation methods. Microbumps 40 serve as alignment standoffs when mounting planar waveguide assembly 680 to structure 600. The required height H40 for microbumps 40 is calculated from the measured offsets as H40=D1–D3–D2.

By way of example, considering a typical SOA array substrate 630 of thickness 150-170 μm, a typical adhesive layer 640 of thickness 2-3 μm and a typical light-absorbing glass substrate 12 of thickness 125-145 μm, heights H40 are expected to be in the 5 to 40 μm range. In an example embodiment, for an SOA array substrate 630 of thickness $T_{630}$ and an light-absorbing substrate thickness $T_{12}$, the maximum required microbump heights can be reduce by pre-selecting IR-absorbing glass substrates according to the relationship: $T_{12} \sim T_{630} - (D2+D3)$.

Figure 27:
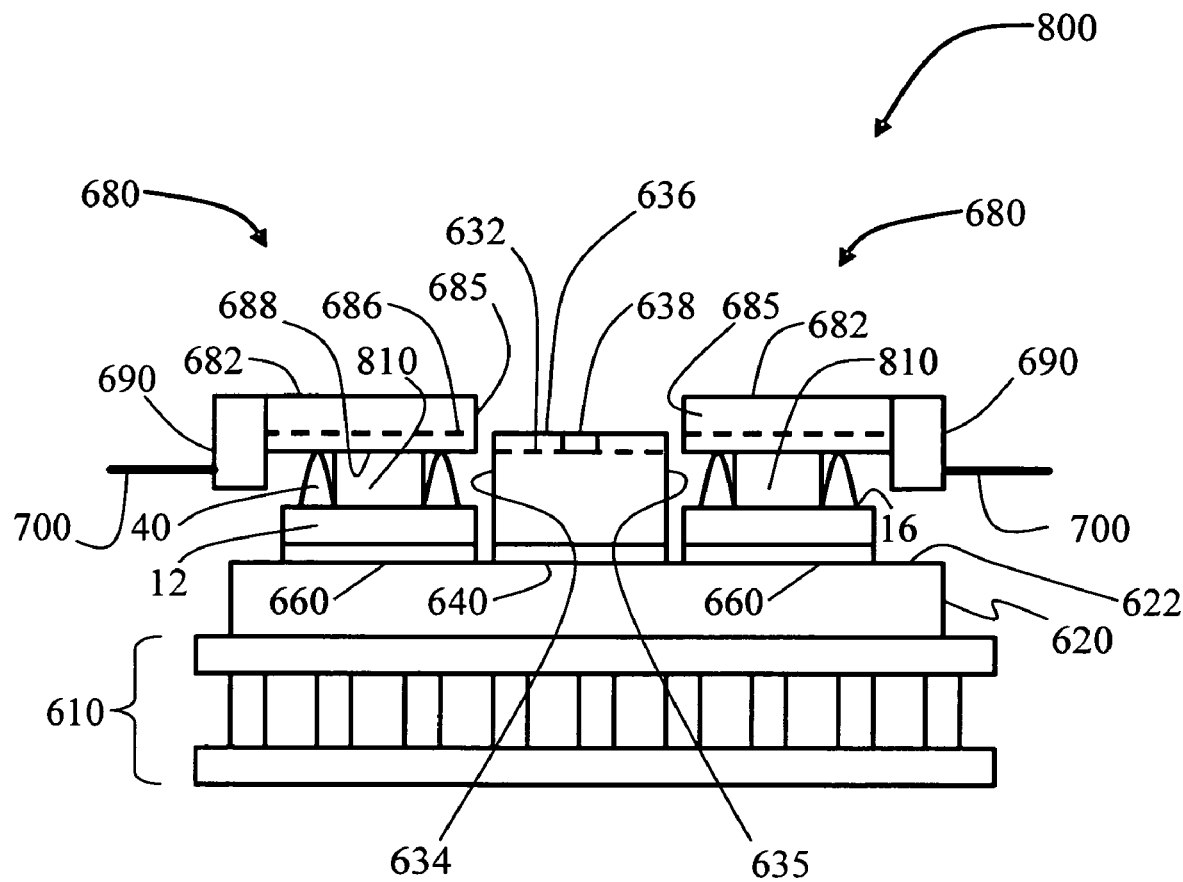
FIG. 27 is the same schematic side view as FIG. 26, but further showing the planar waveguide assemblies secured to the microbumps on opposite sides of the SOA and micropositioned with respect to the SOA via the microbumps.

FIG. 27 is a schematic side view of a finalized WSS assembly 800. Assembly 800 includes planar waveguide assemblies 680 arranged on either side of SOA substrate 630 and supported by microbumps 40. Planar waveguide substrates 682 are secured to light-absorbing substrate upper surface 16 (and to microbumps 40) via a thermal cure organic adhesive layer 810. Microbump heights H40 are selected so that waveguides 688 in waveguide substrates 682 align with SOA waveguides 636.

In the schematic side view of FIG. 27, SOA substrate upper surface 632 is shown as parallel to light-absorbing glass substrate upper surface 16. In practice, this may not happen automatically. Accordingly, in an example embodiment the microbump alignment process includes compensating for tilt between SOA substrate 630 and planar waveguide substrates 682.

Figure 28:
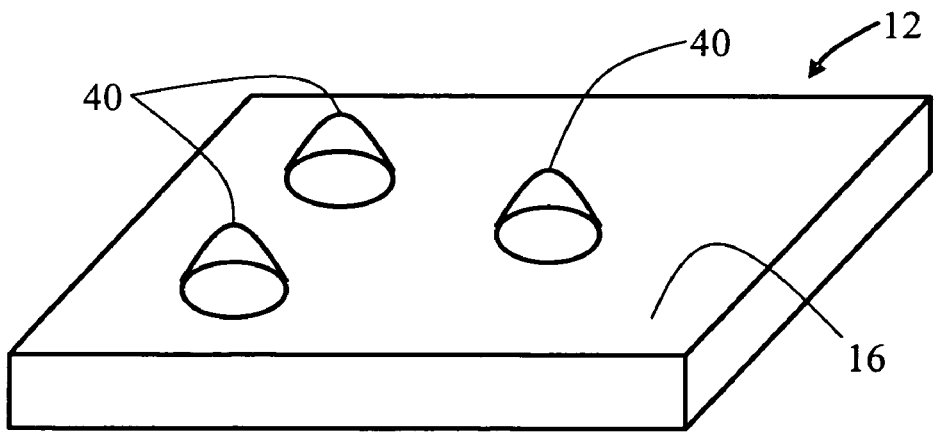
FIG. 28 is a perspective view of one of the light-absorbing substrates of the WSS assembly of FIG. 27, illustrating a microbump configuration suitable for efficiently micropositioning the planar waveguide assemblies with respect to the SOA.

With reference now to FIG. 28, in an example embodiment, such tilt compensation is provided by forming three microbumps 40 in arranged in a triangular pattern in light-absorbing substrate surface 16. The height H40 of each microbump is set so that when the planar waveguide substrate 682 is mounted on all three microbumps, the planar waveguides 688 thereon can be aligned to the SOA waveguides 636 through simple translations and/or rotations in the plane formed by the tops of the three microbumps 40.

Planar waveguide substrates 682 are then mounted on the triangular arrangement of microbumps 40 and translated and rotated so that waveguides 688 are aligned to the SOA array waveguides 636. In an example embodiment, this alignment process is automated using a position feedback process, such as from top-side imaging.

In another example embodiment, the alignment of waveguides 636 and 688 is performed using active optical feedback. In this case, power is selectively applied to one of SOA waveguides 636, and light coupled into planar waveguides 688 is measured at the optical fiber pigtail 690 using a detector head or integrating sphere. By electronically driving one outboard SOA amplifier 638 at a time, a measurement of how well the entire waveguide array is aligned is obtained, providing immediate feedback for the translation/rotation micropositioning systems.

Once waveguide arrays 636 and 688 are aligned, the thermal cure adhesive layer 810 between the planar waveguide substrate 682 and light-absorbing glass substrate 12 is partially cured using a short heat burst. The relatively thin layer of thermal cure adhesive minimizes lateral shifts in curing that can introduce waveguide array misalignments. In an example embodiment, heat for curing adhesive layer 810 is generated by the same source of heat use to create microbumps 40, or by thin film heaters (not shown) fabricated on lower surface 15 (see FIG. 2) of light-absorbing glass substrate 12. This partial adhesive cure ensures that the substrates are held in alignment during the longer post-assembly thermal curing.

WSS assembly 800 described above employed planar waveguide substrates 682 mounted with their waveguide sides down. This approach assumes that any electrical interconnections required by the planar waveguide substrates (e.g., for planar waveguide heaters) are made via using flip-chip solder ball or bump techniques. It also assumes that an light-absorbing glass substrate 12 with a thickness of 125-145 μm can be used to create bumps with heights of up to 40 μm. In some applications, however, it is desirable to have planar waveguide substrates 682 mounted with their waveguide sides up. This approach allows for planar waveguide substrate electrical interconnections to be implemented using wirebond interconnections.

Figure 29:
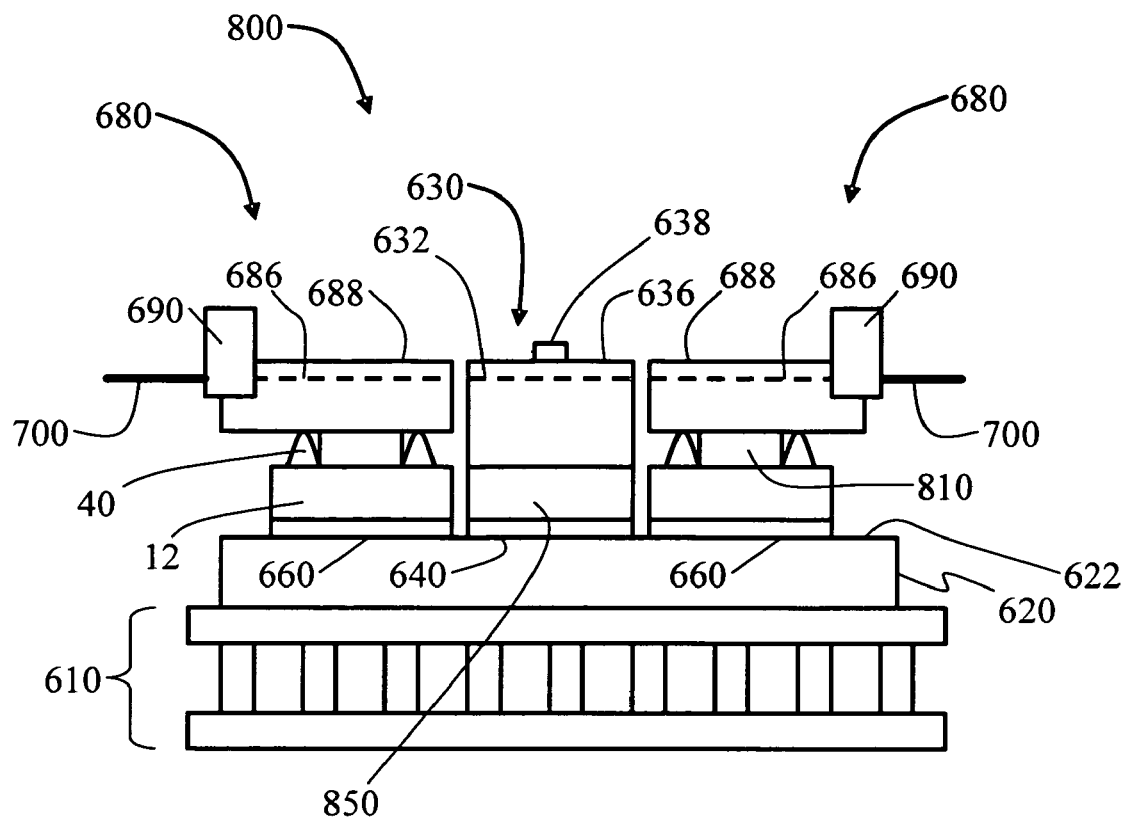
FIG. 29 is a schematic side view of an example embodiment of a WSS assembly similar to that of FIG. 27, but wherein each planar waveguide assembly is arranged with its waveguides "up" rather than "down.

FIG. 29 is a schematic diagram of an alternate example embodiment of WSS assembly 800 similar to that illustrated in FIG. 26, but wherein planar waveguide substrates 682 are mounted with waveguides 688 "up" rather than "down." To accommodate this geometry, assembly 800 further includes an SOA post 850 arranged between the SOA substrate 630 and alignment substrate 620 so as to elevate the SOA substrate. SOA post 850 positions SOA substrate 630 high enough above alignment substrate 620 so that low-loss alignment of SOA waveguides 636 can be made to waveguides 688 in planar waveguide substrates 682. SOA post 850 also allows for the use of thicker light-absorbing glass substrates 12 (e.g., up to 1-2 mm thick). These thicker light-absorbing glass substrates 12 are capable of producing greater microbump heights than thin substrates, which is important because the microbump structures must also compensate for planar waveguide substrate thickness variations (typically +/−50 μm). In an example embodiment, SOA post 850 is attached to alignment substrate 620 using a thermally-conductive material 640 (e.g., solder), or by integrating it into the construction of the alignment substrate (e.g., using a molded or laminated alignment substrate). In either case, the height of SOA post 850 can be set to within +/−20 μm by polishing it to target height in a custom polishing fixture.

Example Micropositioning Process

The planar waveguide substrate micropositioning approach described above requires control of microbump height H40 on the order of the acceptable vertical lateral misalignment for coupled waveguide pairs—e.g., +/−~0.2 μm for waveguides with mode field diameters of ~4 μm. In the event that this degree of microbump height control is not possible with a given light-absorbing glass substrate material (due to composition uniformity challenges, for example), in an alternative example embodiment a triangular microbump configuration that leverages mechanical advantage is employed.

Figure 30:
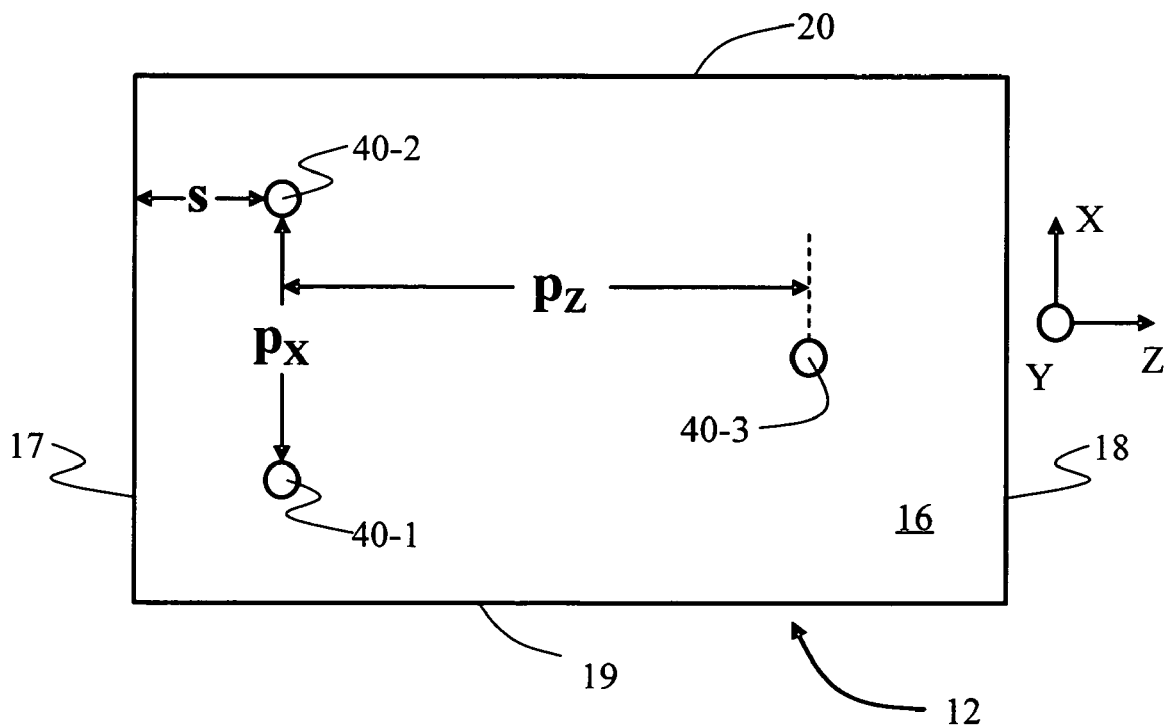
FIG. 30 is a plan view of the light-absorbing substrate of the WSS assembly of FIG. 27, illustrating an example microbump configuration for micropositioning the planar waveguide assemblies relative to the SOA.

FIG. 30 is a plan view of light-absorbing substrate surface 16 showing an example embodiment of a configuration for microbumps 40. Cartesian coordinate axes are also included in FIG. 30 to indicate direction, with the Y-direction being out of the paper. Substrate 12 includes a first edge 17 that ultimately is to be arranged adjacent SOA substrate 630 of WSS assembly 800, and a second edge 18 opposite first edge 17. The configuration includes two bumps 40-1 and 40-2 spaced a distance $p_x$ apart and each positioned a distance s away from substrate first edge 17. The configuration includes another microbump 40-3 positioned a distance $p_z$+s away from substrate edge 18 and halfway between microbumps 40-1 and 40-2.

In the first step of the example alignment process, microbumps 40-1 and 40-2 are formed to select heights H1 and H2, respectively. With reference now to FIG. 29, planar waveguide substrate 682 is mounted on the two microbumps 40-1 and 40-2, with substrate edge 17 butted against SOA substrate edge 635, which is parallel to SOA array waveguides 636. In this case, planar waveguide substrate edge 635 is parallel to imaginary lines running through the centers of waveguides 636. In a practical system, small deviations from this parallel case are allowed, as long as the difference in the vertical lateral misalignment of SOA waveguides 636 relative to planar waveguide substrate edge 635 is less than a select tolerance $d_T$, e.g., $d_T$~0.2 μm.

Figure 31:
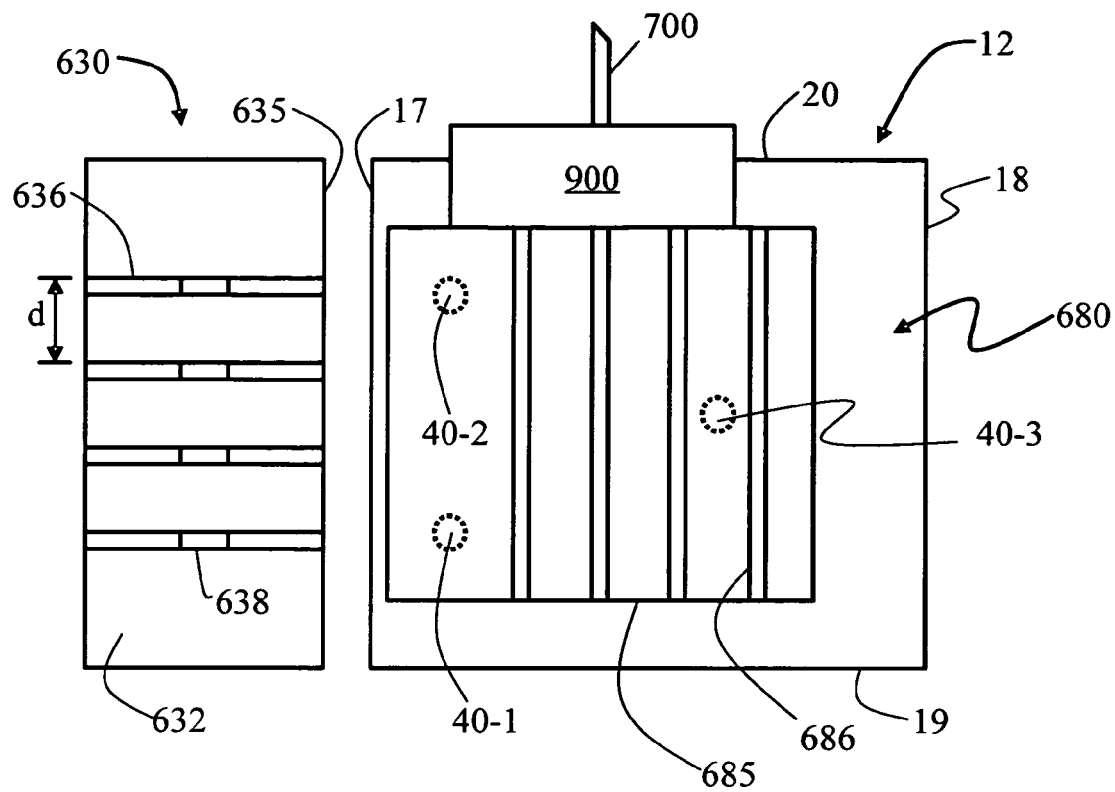
FIG. 31 is a plan view similar to that of FIG. 30, illustrating the step of arranging the planar waveguide assembly atop the microbumps with its waveguides oriented perpendicular to the SOA waveguides.

If the center-to-center distance between SOA array waveguides 636 is d, then $d=(N-1) p_{array}$, where N is the number of waveguides and $p_{array}$ is the waveguide array pitch (d is shown as the edge-to-edge distance in FIG. 31, which is the same as the center-to-center distance). Exploiting the lever arm inherent in the microbump configuration of FIG. 30, the microbump heights H1 and H2 can vary by as much as $(d_T)(p_x)/2d$ from their target positions and still keep vertical lateral misalignments below $d_T$. For a typical system, N=8 and $p_{array}$=100 μm. If bump spacing $p_x$=8 mm, then microbump heights H1 and H2 can vary by as much as 1.14 μm and still maintain vertical lateral misalignments less than 0.2 μm. This configuration therefore relaxes the microbump height accuracy requirements for the system.

Figure 32:
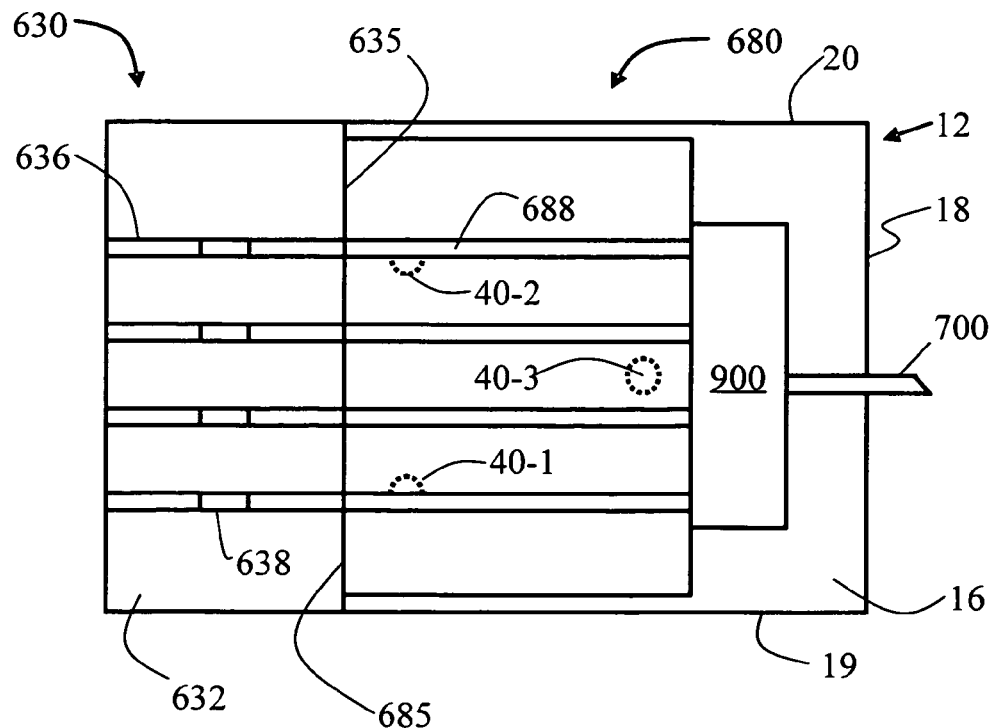
FIG. 32 is a plan view similar to that of FIG. 30, but with the planar waveguide assembly rotated into its final position atop the microbumps with its waveguides micropositioned so as to be aligned with and optically coupled to the SOA waveguides.

Once bump heights H1 and H2 have been set, the height H3 of remaining bump 40-3 is set and planar waveguide substrate 682 is rotated so that waveguides 688 align with SOA substrate waveguides 636, as illustrated in FIG. 32. Here, microbumps 40-1 and 40-2 serve as a fulcrum, translating every 1 μm upward motion bump 40-3 into a downward motion of the planar waveguide substrate waveguide array end region by $s/p_Z$. If s=1 mm and $p_Z$ equals 5 mm, then vertical motion of the planar waveguide substrate end 17 by a distance $d_Z$=0.2 μm corresponds to a change in microbump height H3 of 1 μm.

This tuning approach tends to relax the microbump height tolerances, but at the same time generally increases the maximum bump height required. Careful selection of microbump positions along the lines illustrated above offers a way to balance limitations in microbump height resolution and maximum height, providing an optimal match to the characteristics of the selected light-absorbing glass substrate.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of forming a microbump for micropositioning an optical element, comprising:
   providing a glass substrate having an upper surface, wherein the substrate is capable of locally expanding when locally heated;
   locally heating the substrate to cause local expansion of the substrate so as to create a microbump in the substrate surface; and
   terminating heating of the substrate so as to fix the microbump, wherein the microbump is formed so as to microposition the optical element relative to the substrate surface or to another optical element.

2. The method of claim 1, wherein the glass substrate comprises a light-absorbing substrate, and wherein locally heating the substrate includes locally irradiating the substrate with a light beam.

3. The method of claim 2, wherein the light beam includes at least one of a visible wavelength, a near-infrared wavelength and an infrared wavelength.

4. The method of claim 2, wherein the glass substrate has an upper and lower surface, and wherein locally irradiating the substrate includes irradiating the upper substrate surface to form a microbump on the upper substrate surface.

5. The method of claim 2, wherein locally heating the substrate includes providing heat from a heating element arranged at or near the substrate surface.

6. The method of claim 2, wherein the light-absorbing substrate is monolithic and is doped with at least one light-absorbing species.

7. The method of claim 2, wherein the light-absorbing substrate is layered and includes a light-absorbing base layer, an organic adhesive layer arranged atop the base layer, and a thin light-absorbing top layer arranged atop the adhesive layer, wherein the organic adhesive layer locally expands upon said local heating so as to locally deform the thin light-absorbing top layer to form the microbump.

8. The method of claim 1, wherein the optical element includes a planar waveguide or an optical fiber.

9. The method of claim 1, including heating the microbump after the microbump is formed to change the height of the microbump.

10. A method of micropositioning first and second optical elements relative to each other, comprising:
    arranging the first and second optical elements so that they are roughly aligned to one another, wherein at least one of the first and second optical elements is supported by a glass substrate capable of locally expanding when locally heated; and
    micropositioning at least one of the first and second optical elements by forming one or more microbumps in the glass substrate by locally heating the glass substrate to move at least one of the first and second optical elements to more closely align the first and second optical elements.

11. The method of claim 10, including passing light through the first and second optical elements and monitoring an amount of light transmitted while performing said micropositioning.

12. The method of claim 10, wherein the first and second optical elements include respective first and second waveguides.

13. The method of claim 10, wherein the glass substrate is light-absorbing at an absorption wavelength, and wherein locally heating the substrate includes irradiating the substrate with a light beam that includes the absorption wavelength.

14. An optical assembly, comprising:
    a glass substrate with a surface having one or more glass microbumps; and
    a first optical element supported by the one or more microbumps so as to be micropositioned relative to the substrate surface or to another optical element.

15. The optical assembly of claim 14, wherein the glass substrate is light absorbing at an absorption wavelength and that locally expands when locally irradiated by a light beam that includes the absorption wavelength.

16. The optical assembly of claim 14, including a second optical element, wherein the first and second optical elements respectively include first and second optical waveguides, and wherein the one or more microbumps are shaped and positioned so as to microposition the first optical waveguide to the second optical waveguide.

17. The optical assembly of claim 14, wherein the first optical element includes a first waveguide array and the second optical element includes a semiconductor optical amplifier having a second waveguide array.

18. The optical assembly of claim 14, including a triangular arrangement of microbumps.

19. The optical assembly of claim 14, wherein the glass substrate includes a groove, and wherein the first optical element is an optical fiber micropositioned within the groove.

20. A method of forming a microbump for micropositioning an optical element, comprising:
    providing a glass substrate having an upper surface, wherein the substrate is capable of locally expanding when locally heated;
    locally heating the substrate to cause local expansion of the substrate so as to create a microbump in the substrate surface;
    terminating heating of the substrate so as to fix the microbump; and
    heating the microbump after the microbump is formed to change the height of the microbump.

21. The method of claim 20, wherein the glass substrate comprises a light-absorbing substrate, and wherein locally heating the substrate includes locally irradiating the substrate with a light beam.

22. The method of claim 21, wherein the light beam includes at least one of a visible wavelength, a near-infrared wavelength and an infrared wavelength.

23. The method of claim 21, wherein the glass substrate has an upper and lower surface, and wherein locally irradiating the substrate includes irradiating the upper substrate surface to form a microbump on the upper substrate surface.

24. The method of claim 21, wherein locally heating the substrate includes providing heat from a heating element arranged at or near the substrate surface.

25. The method of claim 21, wherein the light-absorbing substrate is monolithic and is doped with at least one light-absorbing species.

26. The method of claim 21, wherein the light-absorbing substrate is layered and includes a light-absorbing base layer, an organic adhesive layer arranged atop the base layer, and a thin light-absorbing top layer arranged atop the adhesive layer, wherein the organic adhesive layer locally expands upon said local heating so as to locally deform the thin light-absorbing top layer to form the microbump.

27. The method of claim 20, wherein the optical element includes a planar waveguide or an optical fiber.

28. A method of forming a microbump for micropositioning an optical element, comprising:
  providing a glass substrate having an upper surface, wherein the substrate is capable of locally expanding when locally heated;
  locally heating the substrate to cause local expansion of the substrate so as to create a microbump in the substrate surface;
  terminating heating of the substrate so as to fix the microbump, wherein the optical element includes a planar waveguide or an optical fiber.

29. The method of claim 28, wherein the glass substrate comprises a light-absorbing substrate, and wherein locally heating the substrate includes locally irradiating the substrate with a light beam.

30. The method of claim 29, wherein the light beam includes at least one of a visible wavelength, a near-infrared wavelength and an infrared wavelength.

31. The method of claim 29, wherein the glass substrate has an upper and lower surface, and wherein locally irradiating the substrate includes irradiating the upper substrate surface to form a microbump on the upper substrate surface.

32. The method of claim 29, wherein locally heating the substrate includes providing heat from a heating element arranged at or near the substrate surface.

33. The method of claim 29, wherein the light-absorbing substrate is monolithic and is doped with at least one light-absorbing species.

34. The method of claim 29, wherein the light-absorbing substrate is layered and includes a light-absorbing base layer, an organic adhesive layer arranged atop the base layer, and a thin light-absorbing top layer arranged atop the adhesive layer, wherein the organic adhesive layer locally expands upon said local heating so as to locally deform the thin light-absorbing top layer to form the microbump.

* * * * *